(12) United States Patent
Cross et al.

(10) Patent No.: US 9,969,625 B2
(45) Date of Patent: May 15, 2018

(54) COMPONENT RECOVERY FROM METAL QUENCHING BATH OR SPRAY

(71) Applicant: Houghton Technical Corp., Wilmington, DE (US)

(72) Inventors: Alan Edward Cross, Yardley, PA (US); John Michael Burke, Kirtland, OH (US)

(73) Assignee: Houghton Technical Corp., Wilmington, DE (US)

( * ) Notice: Subject to any disclaimer, the term of this patent is extended or adjusted under 35 U.S.C. 154(b) by 275 days.

(21) Appl. No.: 14/899,207

(22) PCT Filed: Jun. 17, 2014

(86) PCT No.: PCT/US2014/042651
§ 371 (c)(1),
(2) Date: Dec. 17, 2015

(87) PCT Pub. No.: WO2014/204908
PCT Pub. Date: Dec. 24, 2014

(65) Prior Publication Data
US 2016/0145120 A1    May 26, 2016

Related U.S. Application Data

(60) Provisional application No. 61/836,384, filed on Jun. 18, 2013, provisional application No. 61/866,198, filed on Aug. 15, 2013.

(51) Int. Cl.
*B08B 7/04* (2006.01)
*C02F 1/02* (2006.01)
(Continued)

(52) U.S. Cl.
CPC ............ *C02F 1/02* (2013.01); *C02F 1/444* (2013.01); *C10L 1/02* (2013.01); *C11B 13/00* (2013.01);
(Continued)

(58) Field of Classification Search
CPC ........ C02F 1/02; C02F 1/444; C02F 2103/16; C02F 2303/10; C10L 1/02; C10L 2290/06;
(Continued)

(56) References Cited

U.S. PATENT DOCUMENTS 4,305,574 A * 12/1981 Amend ............... C21D 1/667
                                                134/122 R
4,395,022 A *  7/1983 Paulus ................ C21D 1/60
                                                140/2

(Continued)

FOREIGN PATENT DOCUMENTS

WO    WO-01/74468       10/2001
WO    WO-2009/048648    4/2009
WO    WO-2012 134982    10/2012

OTHER PUBLICATIONS

Totten, G.E. et al., Importance of Quench Bath Maintenance, May 2011 Retrieved from the Internet: <URL: 28127125-26, 29-30, http://www.docstoc.com/docs/79467930/I MP ORT ANGE-OF-QUENCH-BA TH-MAINTENANCE>, in International Search Report.

(Continued)

*Primary Examiner* — Eric W Golightly
(74) *Attorney, Agent, or Firm* — Howson & Howson LLP

(57) ABSTRACT

A process for recycling aqueous quenching fluids, said process comprising: (a)(1) providing a metal quenching bath tank comprising a used metal aqueous quenching fluid containing contamination with a water insoluble, fire resis-
(Continued)

Figure 1A:
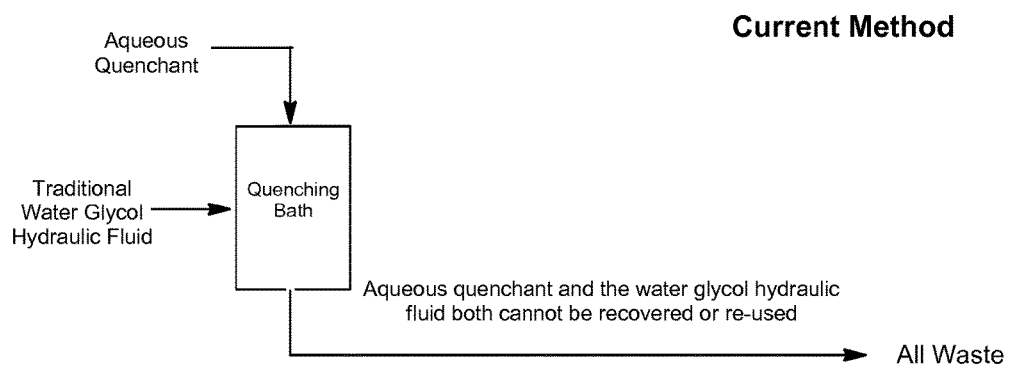

tant hydraulic fluid; or (a)(2) collecting, in a collection tank in association with a quench barrel or quench ring, used metal aqueous quenching fluid after the fluid has been sprayed onto heated metal, wherein the collected used fluid is contaminated with a water insoluble, fire resistant hydraulic fluid; (b) heating the bath tank (a)(1) or collection tank (a)(2) to a temperature of about 105 to 200° F. with agitation for less than 12 hours; (c) recovering a resulting uncontaminated aqueous quenching phase from a lower portion of the bath tank (a)(1) or collection tank (a)(2); and (d) returning the recovered aqueous quenching phase to a functional quenching bath tank or functional quenching spray tank.

18 Claims, 8 Drawing Sheets

(51) Int. Cl.
| | | |
|---|---|---|
| C21D 1/63 | (2006.01) | |
| C21D 1/58 | (2006.01) | |
| C21D 1/60 | (2006.01) | |
| C02F 1/44 | (2006.01) | |
| C10L 1/02 | (2006.01) | |
| C11B 13/00 | (2006.01) | |
| C21D 1/64 | (2006.01) | |
| C21D 11/00 | (2006.01) | |
| C02F 103/16 | (2006.01) | |

(52) U.S. Cl.
CPC ............... *C21D 1/58* (2013.01); *C21D 1/60* (2013.01); *C21D 1/63* (2013.01); *C21D 1/64* (2013.01); *C21D 11/005* (2013.01); *C02F 2103/16* (2013.01); *C02F 2303/10* (2013.01); *C10L 2290/06* (2013.01); *C10L 2290/46* (2013.01); *C10L 2290/547* (2013.01); *Y02P 10/212* (2015.11)

(58) Field of Classification Search
CPC . C10L 2290/46; C10L 2290/547; C21D 1/58; C21D 1/60; C21D 1/63; C21D 1/65; C21D 11/005; Y02P 10/212; C11B 13/00
See application file for complete search history.

(56) References Cited

U.S. PATENT DOCUMENTS

| | | | | |
|---|---|---|---|---|
| 4,738,731 | A | * | 4/1988 | Foreman ............ C21D 1/60 148/28 |
| 5,194,159 | A | * | 3/1993 | George ............ B01D 61/025 210/500.41 |
| 5,490,886 | A | | 2/1996 | Placek |
| 5,820,705 | A | * | 10/1998 | Yu ............ C21D 1/56 148/633 |
| 6,521,142 | B1 | | 2/2003 | Holgado |
| 8,034,285 | B2 | | 10/2011 | Canner |
| 2005/0020457 | A1 | | 1/2005 | Rohrbach |
| 2008/0113886 | A1 | * | 5/2008 | Kinker ............ C10M 129/38 508/111 |

OTHER PUBLICATIONS

International Search report dated Oct. 16, 2014 in corresponding International Patent Application No. PCT/US14/42651, filed Jun. 17, 2014.
Written Opinion dated Oct. 16, 2014 in corresponding International Patent Application No. PCT/US14/42651.
International Preliminary Report Report on Patentability dated Dec. 30, 2015 in corresponding International Patent Application No. PCT/US2014/042651, filed Jun. 17, 2014.

* cited by examiner

Current Method

Aqueous quenchant and the water glycol hydraulic fluid both cannot be recovered or re-used

Claimed Method

Dual Benefits:
1. Less waste
2. Recoverable of salable hydraulic oil

Aqueous Quenchant Recovery with Ultrafiltration for Example 8

COMPONENT RECOVERY FROM METAL QUENCHING BATH OR SPRAY

CROSS-REFERENCE TO RELATED APPLICATIONS

This application is a national stage of International Patent Application No. PCT/US2014/042651, filed Jun. 17, 2014, which claims the benefit of the priority of U.S. Provisional Patent Application No. 61/836384, filed Jun. 18, 2013 and U.S. Provisional Patent Application No. 61/866198, filed Aug. 15, 2013, which applications are incorporated herein by reference.

BACKGROUND

Various methods of heat treating metal substrates are known and include heating a metal substrate to an elevated temperature and then cooling. The cooling step, which is known in the art as "quenching", typically is performed rapidly and is accomplished by either immersion quenching or spray quenching Immersion quenching involves immersing the hot metal substrate in a liquid quenching medium, i.e. a quenching bath. Spray quenching involves spraying quenchant on the heated metal part as it travels through a quench barrel or quench ring. The process of quenching involves the use of certain hydraulic equipment, which requires hydraulic fluids for performance. These quenching systems typically use large amounts of both aqueous quenchant and hydraulic fluid. The amount of quenchant used can be sizable depending upon the size of the metal product that is being quenched.

A metal quenchant, e.g., bath or spray, is typically made up of a variety of known quenching products (polymer and additives) and water. To cool the metal appropriately, a functional quenchant must meet selected quenching specifications, which can be unique to each quenching product. These quenching specifications are monitored during the quenching process. If or when the quenching specifications are no longer met by the bath or spray during the quenching process, the quenching bath or spray becomes ineffective and results in unsatisfactory (i.e., delayed) cooling of the metal or an unsatisfactory (e.g., warped, marked or cracked or otherwise deformed) metal substrate produced from the quenching process.

While components of the aqueous quenching bath or spray can become too concentrated due to heat and/or the quantities of materials in the bath or spray can reach unusable ratios, it is generally contamination with the hydraulic fluid from the hydraulic equipment which causes the quenchant to cease to meet its quenching specifications. Therefore, periodically, the quenchant components in the bath or spray must be replenished.

Commonly, a quenching process employs an aqueous quenching product and the hydraulic equipment employs a water glycol-based hydraulic fluid, e.g., such as those represented by the trade names, Houghto-Safe® 419R and Houghto-Safe® 620 hydraulic fluid (Houghton International, Inc.) In such systems the aqueous quenchant in the quenching bath or spray becomes contaminated by the water glycol hydraulic fluid. The resulting contaminated quenchant is a fluid from which the two components cannot be readily separated for recovery and reuse. The entire contaminated quenchant removed from the quenching bath tank or spraying devices is directed to waste streams when the quenching bath or spray fails to meet its quenching specifications. There is no useful recycling due to the miscibility of the two major components. Waste treatment typically entails mixing the waste with water, thereby generating in excess of 100,000 gallons of waste water per day for the metal quenching industry.

SUMMARY OF THE INVENTION

Novel processes and systems enabling the recycling of aqueous quenching fluids are described herein. These processes enable recycling of both quenching bath/quenching spray and the hydraulic fluid, and thereby generate considerably less waste.

In one aspect, a process is provided for increasing the efficiency of a metal quenching bath. The process includes providing in a container a used metal aqueous quenching bath containing sufficient contamination with a water insoluble, fire resistant hydraulic fluid, wherein the bath is no longer within its quenching specifications; heating the bath to a temperature within the range of 105 to 200° F. with agitation for less than 12 hours; recovering the resulting uncontaminated aqueous quenching bath phase from the lower portion of the container; returning the recovered aqueous quenching bath to a functional quenching bath; and optionally recovering the hydraulic fluid phase from the container and reusing same as a fuel, e.g., biofuel, or waste hydraulic oil. In one embodiment, this process is continuous. In another embodiment, this process is a discontinuous or batch process.

In another aspect, a quenching and recycling system for use in metal or metal alloy quenching comprises the following components: a quenching tank for the immersion of a metal or metal alloy substrate, wherein the tank is designed to contain an aqueous quenching bath which meets required quenching specification, and hydraulic equipment associated with the tank which uses water-insoluble, fire-resistant hydraulic fluid. During use the quenching bath in the quenching tank becomes contaminated with water insoluble, fire resistant hydraulic fluid. Additional components include an optional agitation device for agitating the quenching tank; a temperature controller system to cool the quenching bath in the quenching tank, which increases in temperature during the quenching process; a first collection tank adjacent the quenching tank and connected to it via a first conduit to remove quenching bath which does not meet its quenching specifications; a heater capable of heating the first collection tank to a temperature within the range of 105 and 200° F. for 15 minutes to 24 hours; an optional agitation device for agitating the first collection tank; a second conduit exiting the lower portion of the first collection tank and connected to the quenching tank for return of the aqueous quenching bath phase; and an optional third conduit for removing the hydraulic oil fluid to a second collection tank for reuse as fuel or hydraulic oil. Additional embodiments are described in detail below.

In another aspect a process is provided for increasing the efficiency of metal spray quenching by collecting, in a collection tank in association with a quench barrel or quench ring, used metal aqueous quenching fluid after the fluid has been sprayed onto heated metal. The collected used fluid is contaminated with a water insoluble, fire resistant hydraulic fluid, and the collected fluid is no longer within its quenching specifications. The process further includes heating the collected fluid to a temperature of about 105 to 200° F. with agitation for less than 12 hours; recovering the resulting uncontaminated aqueous quenching phase from the collection tank; and returning the recovered aqueous quenching phase to a functional quenching spray. The process optionally includes recovering the hydraulic fluid phase from the collection tank and reusing same as a fuel, e.g., biofuel, or waste hydraulic oil. In one embodiment, this process is continuous. In another embodiment, this process is a discontinuous or batch process.

In still a further aspect, a quenching and recycling system for use in metal or metal alloy quenching, comprises a quench barrel or quench ring designed to apply an aqueous quenching spray onto a heated metal or metal alloy substrate, wherein the quenching spray meets required quenching specifications; hydraulic equipment associated with the quench barrel or quench ring, which uses water-insoluble, fire-resistant hydraulic fluid; a first collection tank associated with the quench barrel or quench ring so as to collect used aqueous quenching spray following its application onto the metal substrate; a heater capable of heating the first container to a temperature of about 105 and 200° F. for about 15 minutes to 12 hours; an agitation device for agitating the first collection tank; a conduit exiting the lower portion of the first collection tank and connected to a functional aqueous quenching spray tank for return of the aqueous quenching spray phase; and an optional second conduit for removing the hydraulic oil fluid phase to another collection tank for reuse as fuel or hydraulic oil.

Other aspects, embodiments, and advantages of the process and system will be readily apparent from the following detailed description of the invention.

DETAILED DESCRIPTION OF THE FIGURES

FIG. 1A is a schematic of a conventional quenching system in which an aqueous quenchant is used and which becomes contaminated by a water glycol hydraulic fluid in the course of use. The quenching bath system includes an agitator (not shown) for continuous agitation of the quenching tank and a heater/cooler apparatus (not shown) that keeps the quenching bath at a desired temperature. The arrows indicate the direction that the contaminated quenching bath flows through the simple system. Aqueous quenching fluid and the water glycol hydraulic fluid cannot be recovered or reused and the lower arrow represents that the entire depleted quenching bath is sent to the waste stream.

Figure 1B:
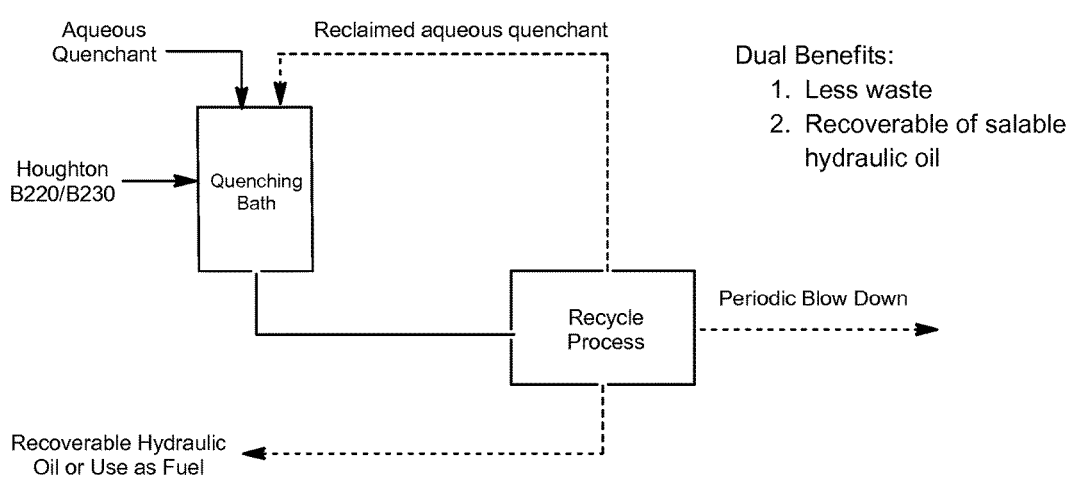

FIG. 1B is a schematic of the newly described quenching bath system in which an aqueous quenchant is used and which becomes contaminated by a water insoluble, fire-resistant hydraulic fluid (exemplified as Cosmolubric® B-220 FMA /B-230, Houghton) in the course of use. The quenching bath system includes an agitator (not shown) for continuous agitation of the quenching tank and a heater/cooler apparatus (not shown) that keeps the quenching bath at a desired temperature. The solid arrows indicate the direction that the contaminated quenching bath flows through the system. Aqueous quenching fluid contaminated with a water insoluble hydraulic fluid is withdrawn from the quenching tank through a first conduit to a first container. The first container is associated with a heater and agitator to permit rapid separation of the aqueous quenching bath product from the hydraulic fluid oil-based phase. The upper dashed line shows the direction of flow of the recycled aqueous quenching fluid which is pumped from the first container back into the quenching tank for reuse. The lower dashed line shows the direction of flow of the separated hydraulic fluid which is collected for use as a fuel, e.g., biofuel, or as waste hydraulic oil. The dashed and dotted line to the left indicates the direction of waste products removed from the first container during periodic blow-down or rinsing of the tank. This system permits the quenching system to produce significantly less waste than that of FIG. 1A and enables recycling of both components of the contaminant quenching fluid, thereby having advantages both in cost and environmental impact.

Figure 2:
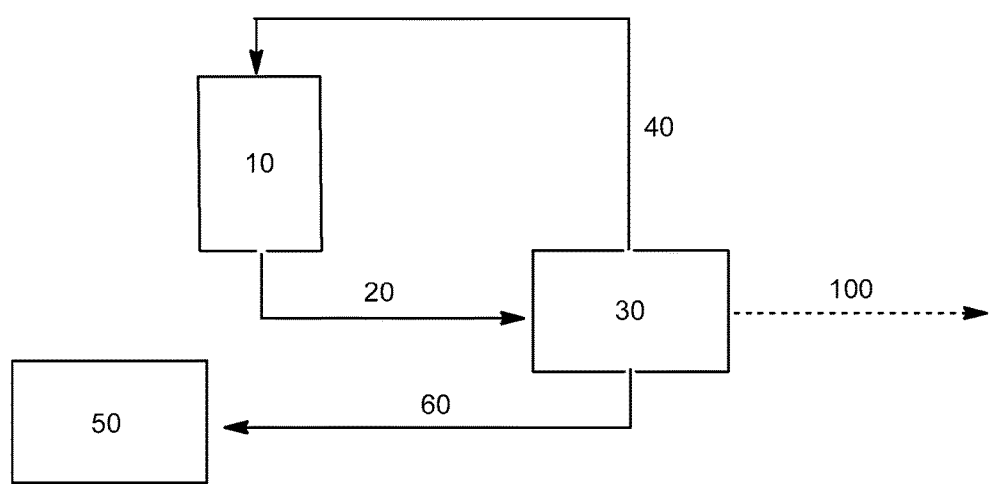

FIG. 2 is a schematic of an embodiment of the recycling system described herein showing quenching bath tank 10, the conduit 20 through which the contaminated quenching bath to transferred to collection/separation tank 30, in which the separation of the miscible components occurs, conduit 40 through which the recycled aqueous quenching fluid is returned to quenching tank 10, conduit 60 through which the hydraulic oil is transferred to collection tank 50 for disposition as fuel, e.g., biofuel, or waste fuel, and conduit 100 through which the waste fluid is transported after rinsing or blow down of the system.

Figure 3:
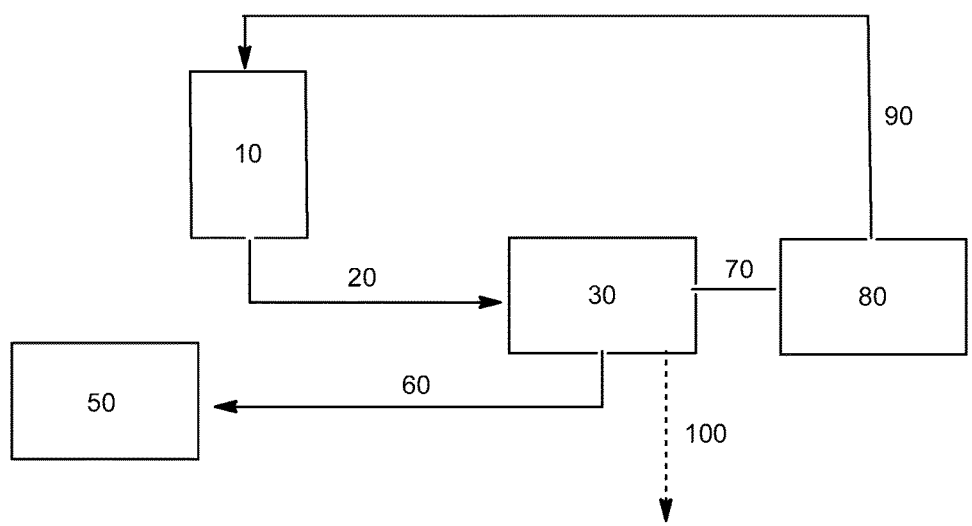

FIG. 3 is a schematic of another embodiment of the recycling system described herein showing quenching bath tank 10, the conduit 20 through which the contaminated quenching bath to transferred to collection/separation tank 30, in which the separation of the miscible components occurs, conduit 70 through which the recycled aqueous quenching fluid is transferred to another collection tank 80 for cooling and/or adjustment of concentration, conduit 90 through which the cooled and/or concentrated, recycled aqueous quenching fluid is returned to quenching tank 10, conduit 60 through which the hydraulic oil is transferred to collection tank 50 for disposition as fuel, e.g., biofuel or waste fuel, and conduit 100 through which the waste fluid is transported after rinsing or blow down of the system.

Figure 4:
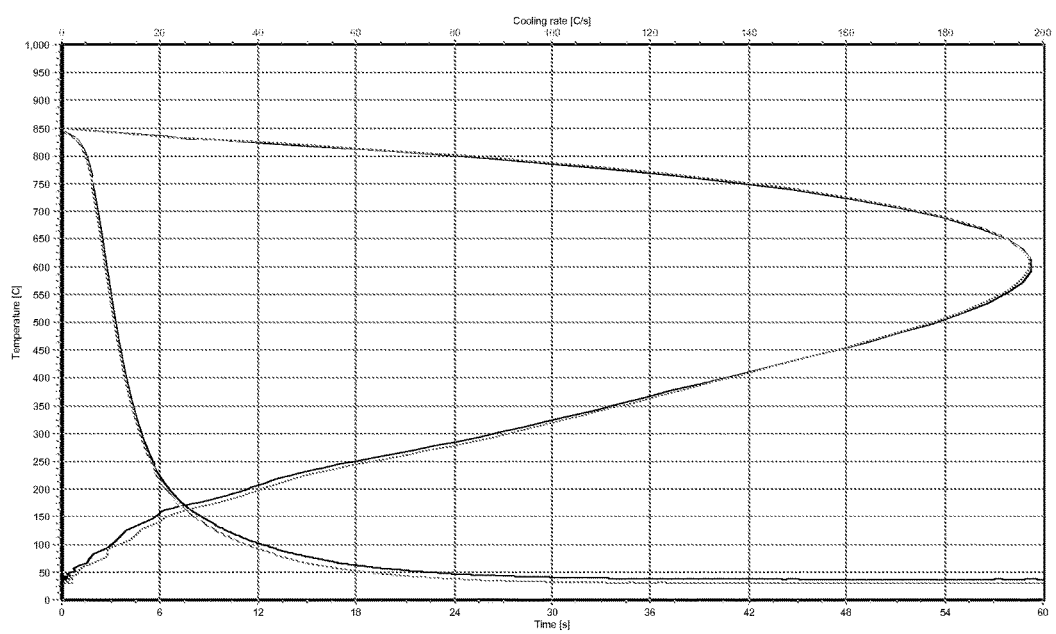

FIG. 4 is a graph illustrating cooling curves generating for an aqueous quenchant before contamination and after contamination with, and separation from, a water insoluble hydraulic fluid. These curves essentially lay one on top of each other, indicating that the recovered aqueous quenching fluid had the same properties as those of the quenching fluid prior to contamination.

Figure 5:
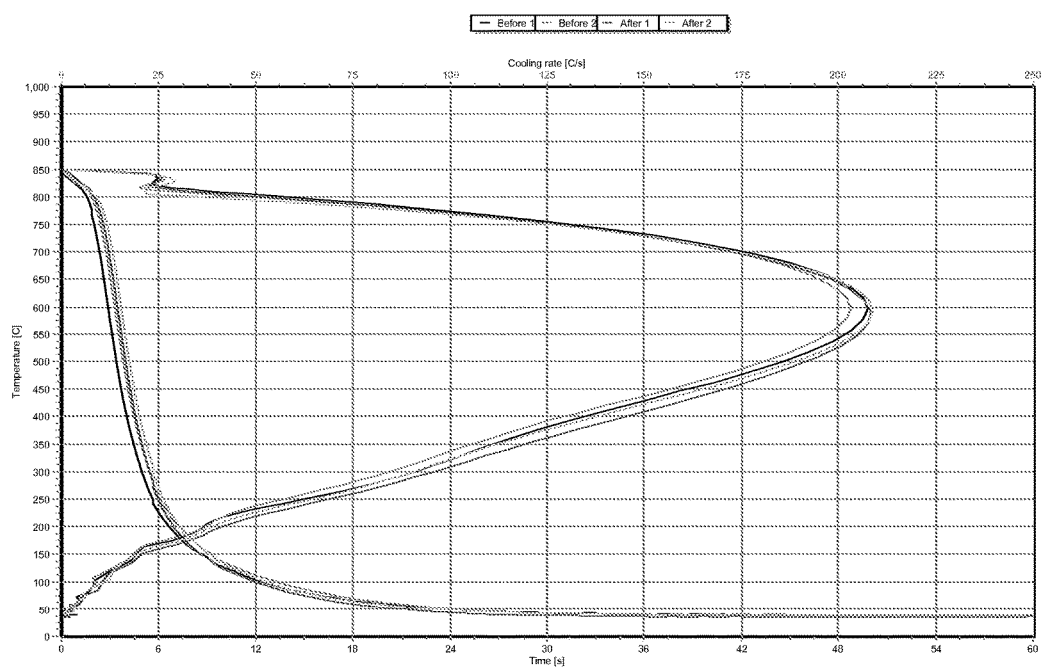

FIG. 5 is a graph illustrating cooling curves generating for an aqueous quenchant before contamination and after contamination with, and separation including a step of ultrafiltration from, a water insoluble hydraulic fluid. These curves essentially lay one on top of each other, indicating that the recovered aqueous quenching fluid had the same properties as those of the quenching fluid prior to contamination.

Figure 6:
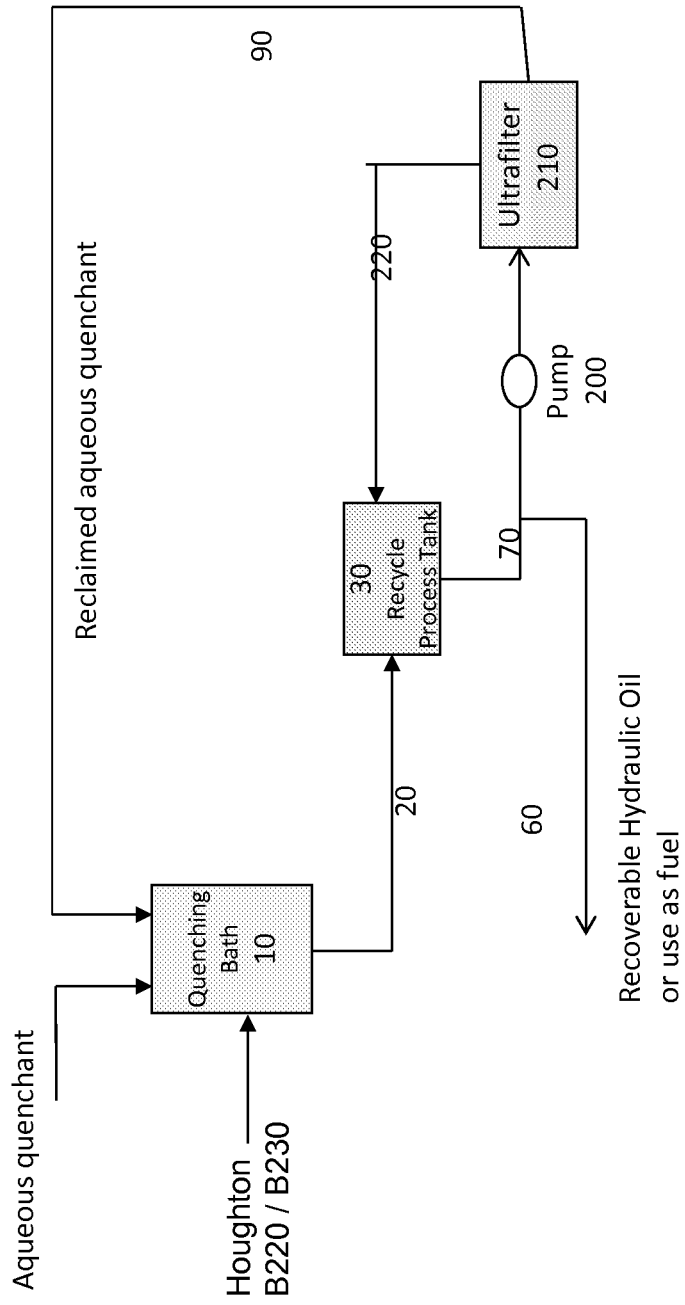

FIG. 6 is a schematic of another embodiment of the recycling system described herein showing quenching bath tank 10, the conduit 20 through which the contaminated quenching bath is transferred to collection/separation tank 30, in which the separation of the miscible components occurs, conduit 70 through which the recycled aqueous quenching fluid is transferred via pump 200 to an ultrafilter 210, conduit 90 through which the filtered, recycled aqueous quenching fluid is returned to quenching tank 10, conduit 60 through which the hydraulic oil is transferred to another collection tank (not shown) for disposition as fuel, e.g., biofuel or waste fuel, and conduit 220 through which the materials in the aqueous fluid that could not pass through the ultrafilter can be recycled back to the tank 30 for additional separation. In an optional system (not shown), conduit 90 can lead to a cooling tank before it is recycled back to bath 10. In another optional system (not shown), another pump and ultrafilter can be positioned after the cooling tank.

Figure 7:
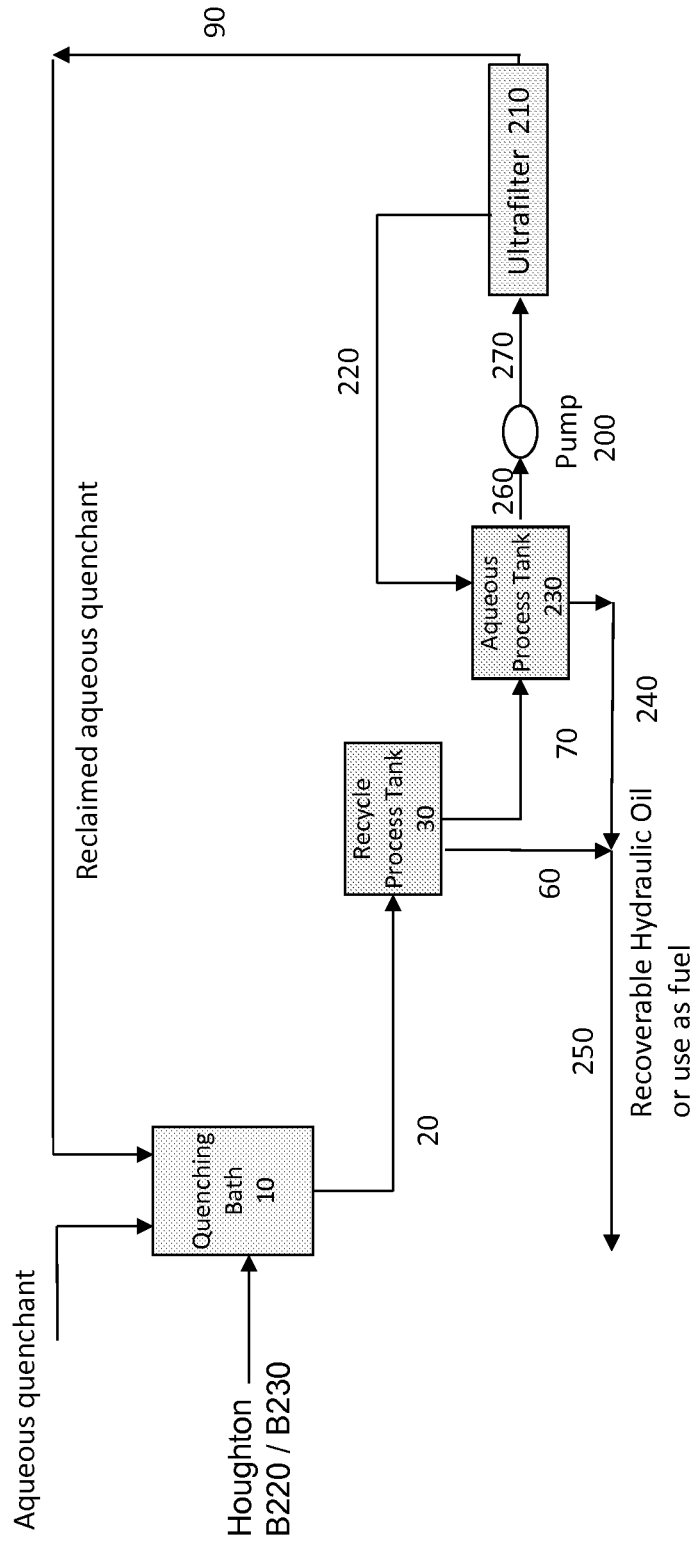

FIG. 7 is a schematic of another embodiment of the recycling system described herein showing quenching bath tank 10, the conduit 20 through which the contaminated quenching bath is transferred to collection/separation (recycle process) tank 30, in which the separation of the miscible components occurs, conduit 70 through which the recycled aqueous quenching fluid is transferred to another tank (aqueous quenching tank) 230. Pump 200 pumps the aqueous phase from tank 230 through conduits 260/270 to an ultrafilter 210. The filtered, recycled aqueous quenching fluid is returned to quenching tank 10 via conduit 90. Materials in the aqueous fluid that could not pass through the ultrafilter 210 are transferred back to the aqueous process tank 230 through conduit 220, where it is admixed with the aqueous phase again and either pumped again through the ultrafilter 210 or eliminated in the hydraulic oil phase. The hydraulic oil phase may be eliminated from the tank 30 through conduct 60 and eliminated from the aqueous process tank 230 through conduct 240. Conduits 60 and 240 join to form conduit 250 through which the hydraulic oil is transferred to a collection tank for disposition as fuel, e.g., biofuel or waste fuel. In an optional system (not shown), conduit 90 can lead to a cooling tank before it is recycled back to bath 10. In another optional system (not shown), another pump and ultrafilter can be positioned after the cooling tank. Similarly other optional pumps may be positioned along the various conduits as needed to transfer the various fluids. This process may be batch or continuous.

Figure 8:
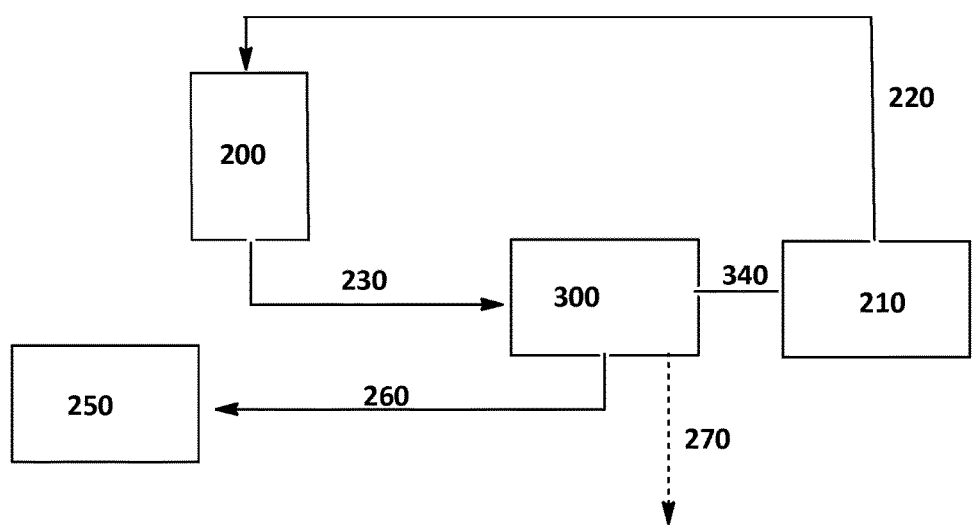

FIG. 8 is a schematic of an embodiment of the recycling system described herein showing quenching barrel or ring 200, functional quenching spray tank 210 which supplies quenching spray fluid to barrel 200 via a conduit 220, an optional first conduit 230 associated with a pump to move the contaminated and used aqueous quenching spray fluid to first collection tank 300. Conduit 340 exits the lower portion of the first collection tank 300 and is connected to the functional quenching spray tank 210 for return of the aqueous quenching phase directly to the quenching spray tank 210. A second conduit 260 removes the hydraulic oil fluid phase from tank 300 to another collection tank 250 for reuse as fuel or hydraulic oil. The dotted line 270 is a conduit for the waste stream.

DETAILED DESCRIPTION OF THE INVENTION

In addressing the need in the metal quenching industry for less expensive processes for quenching metals and metal alloys, the inventors discovered a process that would unexpectedly reduce the large amounts of waste generated in quenching processes by enabling repeated recycling of a water soluble quenching fluid through the metal quenching process. Used aqueous quenching bath fluid, when separated from the used hydraulic fluid from the collection tank according to this process, can be re-used for quenching metals. Similarly used aqueous quenching spray fluid, collected after application to the substrate, from which it is contaminated with hydraulic fluid, can similarly be treated to separate the aqueous quenching spray from the contaminant for re-use for quenching metals.

Although the industry recognized the significant expenses required for disposal of this amount of waste water and contaminated aqueous quenching bath and/or spray and hydraulic fluid, the industry has to date demonstrated no methods for altering the process or reagents, reducing the amount of waste or more inexpensively disposing of the waste generated from these processes. Until this discovery by the inventors, no other industry had successfully been able to recycle an aqueous quenching bath fluid and/or spray after being used in quenching a metal without compromising the quality of the metal or the bath and/or spray quenching specifications. The metal quenching process and system described herein involves using a water-insoluble, fire-resistant hydraulic fluid in place of the more common water-soluble, water glycol hydraulic fluids used in the hydraulic components employed in the quenching process. Due to this modification, the used water insoluble, fire resistant hydraulic fluid and used aqueous quenching bath fluid and/or quenching spray fluid are separated with a collection tank normally used in the quenching process for collection and retention of waste fluids.

Definitions and Components of the Process and System

The term "metal" or "metal substrate" as used herein refers to any metal, metal alloy or metal substrate that can be heated to a high temperature, e.g., up to 1600° C., requiring cooling (e.g., quenching) in a fluid. In one embodiment, the metal substrate contains only one metal. In another embodiment, the metal substrate contains more than one metal, i.e., a metal alloy. For example, the metal substrate may contain one or more of iron, manganese, copper, silicon, sulfur, phosphorus, aluminum, chromium, cobalt, columbium, molybdenum, nickel, titanium, tungsten, vanadium, zirconium, lead, tin, or zinc among others. Specific examples of metals that can be treated according to the quenching methods described herein include those described in "The Heat Treater's Guide", American Society for Metals, 1982, which is hereby incorporated by reference. Employing the methods and system described herein, the resultant metal is not negatively impacted, i.e., it retains its desired porosity ductility, strength such as an excellent strength-to-weight ratio, weight, shape, corrosion resistance mechanical properties, such as good thermal electrical conductivity, high temperature resistance, hardness, wear resistance, durability, and dimensional stability, among others.

The "water-insoluble hydraulic fluid" as used in this process is a hydraulic fluid that provides fire resistance. In one embodiment, the hydraulic fluid is water insoluble and fire resistant. In another embodiment, the hydraulic fluid comprises a vegetable oil such as canola oil (e.g., Houghton Cosmolubric® B-220 FMA or B-230). In still another embodiment, the hydraulic fluid comprises a trimethylolpropane (TMP) ester or polyol ester (e.g., Houghton HF-122 or HF-130). The hydraulic fluids may contain one hydraulic chemical or may be a blend of hydraulic chemicals. The term "hydraulic chemical" as used herein refers to the chemical or reagent in the hydraulic fluid which imparts the hydraulic properties to the hydraulic fluid. In one embodiment, the hydraulic fluid may contain at least 1, 2, 3, 4, or 5 hydraulic chemicals. In another embodiment, the hydraulic fluid contains at least 90% by weight or by volume of one or more hydraulic chemicals. In a further embodiment, the hydraulic fluid contains at least 91, 92, 93, 94, 95, 96, 97, 98, 99, or 100% of hydraulic chemicals. Typically, the hydraulic fluids useful herein have an international standards organization (ISO) grade of about 32 to about 68, including smaller integers and ranges therebetween, although hydraulic fluids have ISO grades below 32 and above 68 may be utilized as determined by one skill in the art, given the teachings of this specification. In one embodiment, the ISO grade of the water-insoluble hydraulic fluids is about 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, or 68. In still other embodiments of useful water-insoluble hydraulic fluids the ISO is greater than 68.

One of skill in the art, given the teachings of this specification, would be able to select a suitable water-insoluble hydraulic fluid for use in the present invention based on the parameters of the process and metal or metal alloy piece being cast. Although not required, it is desirable that the hydraulic fluid and the hydraulic chemical contained therein are biodegradable. In one embodiment, the hydraulic fluid contains as the hydraulic chemical(s), a natural triglyceride, which confers the benefit of a low cost, renewable, natural resource which is environmentally acceptable in contrast to conventional hydraulic fluids containing petroleum-based hydraulic chemicals. Natural triglycerides also possess greater viscosity stability at varying temperatures compared to mineral oil (petroleum-based) products. In another embodiment, the hydraulic fluid has a lower heat of combustion than conventional petroleum-based hydraulic fluids. In a further embodiment, the hydraulic fluid contains as the hydraulic chemicals one or more animal fat or vegetable oil. In still a further embodiment, the hydraulic fluid contains one or more synthetic fatty acid ester, i.e., synthetic ester. In another embodiment, the hydraulic fluid contains as a hydraulic chemical a phosphate ester. In yet another embodiment, the hydraulic fluid contains one or a blend of more than one vegetable oil, such as canola oil, corn oil, cottonseed oil, sunflower oil, peanut oil, soybean oil, coconut oil, Jojoba oil, castor oil, palm oil, and palm kernel oil. In yet another embodiment, the hydraulic fluid contains canola oil. In yet another embodiment, the hydraulic fluid contains as the hydraulic chemicals a blend of animal and vegetable oil with a synthetic fatty acid ester or polyol ester. In still a further embodiment, the hydraulic fluid is the vegetable oil based Cosmolubric® B-220 FMA reagent or the Cosmolubric® B-230 reagent. See, e.g., the hydraulic fluids described in U.S. Pat. No. 6,521,142, which is incorporated herein by reference. Optionally, other conventional hydraulic fluid additive components may be added to the hydraulic fluid compositions discussed herein in amounts by volume of up to 1, 2, 3, 4 or about 5% or percentages therebetween. Such optional components include, for example, antioxidants, corrosion inhibitors, antiwear agents, and viscosity modifiers.

The "aqueous metal quenching fluid" which may be utilized in the quenching processes of the present invention as a bath or a spray is a water soluble aqueous quenching fluid selected by one of skill in the art considering the particular metal or metal alloy, the size of the metal or metal alloy piece, and the size and shape, and other physical characteristics of the die being utilized and given the teachings of this specification. Typically, the quenching fluid in the bath and/or spray is made up of a quenching product (polymer and additives) and water. A variety of aqueous media is available for quenching metal substrates and may include one or more of a polymer. In certain embodiments, the aqueous quenching fluid comprises capped polyalkylene glycols, polyvinylpyrrolidone (PVP), polyvinylpyrrolidone copolymers (VPC), polyethyloxazoline (PeOx), polyethyloxazoline copolymers, polyacrylate, polyacrylate copolymers, or mixtures thereof In certain other embodiments, the aqueous quenching fluid comprises uncapped polyalkylene glycols, polyvinylpyrrolidone (PVP), polyvinylpyrrolidone copolymers (VPC), polyethyloxazoline (PeOx), polyethyloxazoline copolymers, polyacrylate, polyacrylate copolymers, or mixtures thereof In still other embodiments, the aqueous quenching fluid comprises capped and uncapped polymers, such as combinations of those identified herein. In one embodiment, the aqueous quenching fluid (bath and/or spray) comprises polyalkylene glycol (e.g., Houghton Aqua Quench® 365). In another embodiment, the aqueous quenching fluid (bath and/or spray) comprises a polyvinylpyrrolidone (PVP) polymer (e.g., Houghton Aqua Quench® C). In another embodiment, the aqueous quenching fluid (bath and/or spray) comprises a poly(oxyethyleneoxyalkylene) glycol polymer (PeOx) (e.g., Houghton Aqua Quench® 3699). In still another embodiment, the aqueous quenching fluid (bath and/or spray) comprises vinyl polychloride (VPC) (e.g., Houghton Aqua Quench® 4000). In still another embodiment, the quenching fluid (bath and/or spray) includes mixtures of such components.

In one embodiment, the aqueous quenching fluid comprises capped polyalkylene glycols, polyvinylpyrrolidone (PVP), polyvinylpyrrolidone copolymers (VPC), polyethyloxazoline (PeOx), polyethyloxazoline copolymers, polyacrylate, polyacrylate copolymers, or mixtures thereof.

For example, U.S. Pat. No. 3,220,893 discusses a quenching medium containing an oxyalkylene polymer having oxyethylene and higher oxyalkylene groups which form a desirable covering over the metal substrate surface during quenching. The polymer layer that coats the metal permits relatively short quenching times, thereby resulting in minimum internal stress of the metal substrate, minimum distortion of the metal substrate, and imparts uniform hardenability of the metal substrate. U.S. Pat. Nos. 3,902,929, 4,826,545, and RE 34119 discuss aqueous quenching media containing a polyvinylpyrrolidone and U.S. Pat. No. 4,087,290 discusses an aqueous quenching medium containing a water-soluble polyacrylate, such as a sodium polyacrylate, which forms a vapor blanket about the metal substrate during the quenching operation.

Typically, aqueous polymer-based quenching media contain large amounts of polymer, e.g., 10 to 15% by weight, and "drag out" occurs during quenching in which the polymer coating that initially forms around in the metal substrate is removed.

When drag out occurs, the viscosity of the quenching medium changes due to presence of solid polymer, thereby requiring an additional step of washing the quenched metal substrate to remove any of the solid polymer present on the metal substrate.

Still other aqueous quenching media contain a non-ionic, water-soluble or water-dispersible polyvinylpyrrolidone/polyvinylcaprolactam copolymer; and a non-ionic, water-soluble or water-dispersible polymer including one or more of a substituted oxazoline polymer; a poly(oxyethyleneoxyalkylene) glycol polymer; or a polyvinylpyrrolidone polymer, as described in International Patent Application No. WO2009/048648, incorporated by reference herein. These quenching fluids can reduce the drag-out issue identified above.

The aqueous quenching medium may also contain one or more additional components including a carrier. In one example, the carrier is water. The carrier may be included in the quenching medium, thereby permitting use of the product by the customer without addition of further carrier. Alternatively, the carrier is present in the quenching medium in sufficient amounts to provide a stable solution for further dilution by the customer prior to use. The carrier may also be added by the customer to a concentrated quenching medium composition prior to use. However, more water made be added to the composition to ensure that the final quenching medium contains sufficient water for use by the customer.

The aqueous quenching medium may also contain one or more of a bacteriocidal agent or biocide, preservative, corrosion inhibitor such as sodium nitrite, ethanol amine or amine soaps, buffer, metal deactivator, dye, fragrance, caustic agent, wetting agent, sequestering agent, fungicide, and defoamer, among others. Desirably, the additional components include corrosion inhibitors and defoamers.

The phrase "separated" is utilized herein to describe the separation of the hydraulic fluid from the aqueous quenching bath fluid and/or aqueous quenching spray fluid. Specifically, the hydraulic fluid is "sufficiently" or "essentially" immiscible with the aqueous quenching fluid such that the amount of hydraulic fluid retained in the aqueous quenching fluid (bath or spray) does not compromise the properties of the recycled aqueous quenching fluid. More particularly, the heating and separation of the hydraulic fluid from the aqueous fluid (bath or spray) does not reduce the effectiveness and/or efficiency of the aqueous quenching fluid for its subsequent re-use in quenching the metal. In one embodiment, the hydraulic fluid and aqueous quenching fluid do not emulsify when combined. In a further embodiment, the hydraulic fluid and aqueous quenching fluid do not form a rag layer, i.e., a mixture of partially water soluble and oil soluble components when combined. In another embodiment, the hydraulic fluid and aqueous quenching fluid are at least 99% immiscible. In a further embodiment, the hydraulic fluid and aqueous quenching fluid are at least 99.1, 99.2, 99.3, 99.4, 99.5, 99.6, 99.7, 99.8, or 99.9% immiscible In yet another embodiment, the hydraulic fluid and aqueous quenching fluid are 100% immiscible.

Therefore, where throughout this specification, the term "used aqueous quenching fluid" or "used aqueous quenching bath fluid" or "used aqueous quenching spray fluid" is employed, it means aqueous quenching fluid that has been originally employed in a quenching bath or spray, and has been collected with hydraulic fluid as waste, and then separated from the hydraulic fluid as described herein, and recycled through optional multiple additional quenching cycles. In such recyclings, the used aqueous quenching bath fluid or used aqueous quenching spray fluid may be supplemented with additional fresh aqueous quenching fluid.

"Antioxidants" as described herein are useful additives for preventing the degradation of the hydraulic fluid or quenching bath or quenching spray through oxidation. Such antioxidants may be selected from among an aromatic amine, quinoline, and phenolic compounds. In one embodiment, the antioxidant is an alkylated diphenyl amine (Vanlube® NA reagent, polymerized trimethyl-dihydro-quinoline (Vanlube® RD reagent) or 4,4'-methylene bis(2,6-di-tert-butylphenol).

"Corrosion inhibitors" may be selected from the battery of conventional corrosion inhibitors for both ferrous and non-ferrous metals used in the industry. In one embodiment, the corrosion inhibitor is tolyltriazole. However, other known and commercially available corrosion inhibitors could readily be used by one of skill in the art, taking into consideration the teachings of this specification.

"Antiwear agents" or "lubricants" as described herein are well known in industry. Antiwear agents are optionally present in the hydraulic fluids discussed. The antiwear agent is selected from among an amine phosphate which results from the reaction of mono and di-hexyl phosphate with $C_{11}$-$C_{14}$ branched alkyl amines In another embodiment, the antiwear agent is the Irgalube® 349 reagent. One of skill in the art could readily include other suitable phosphorous and sulfur based antiwear agents, taking into consideration the teachings of this specification.

Conventional "viscosity modifiers" may optionally be included in the hydraulic fluids or quenching baths or quenching sprays utilized herein. In one embodiment, the viscosity modifier selected from among a dimer acid ester and polymerized vegetable oil. In another embodiment, the viscosity modifier is a dimer acid ester (the Priolube® 3986 reagent). Other such modifiers may be selected by one of skill in the art, taking into consideration the teachings of this specification.

"De-emulsifiers" as described herein may also optionally be included in the hydraulic fluids or quenching baths or quenching sprays utilized herein. This is particularly useful when high agitation rates are utilized during the process. However, their inclusion in the hydraulic fluids or quenching fluids is not required. One of skill in the art would be able to select a suitable de-emulsifier for use herein, taking into consideration the teachings of this specification.

"Antimicrobial agents" as described herein may optionally be added to the hydraulic fluids or quenching baths or sprays used in the processes described herein to prevent or reduce the accumulation of microorganisms in the system. The particular antimicrobial selected will depend on the process parameters, including aqueous quenching fluid, hydraulic fluid, the metal or metal alloy, the dimensions of the metal or metal substrate being quenched, among others. One of skill in the art would be able to make such a selection, taking into consideration the teachings of this specification.

In one embodiment, the antimicrobial is the Grotan® reagent (Troy Corporation). In another embodiment, the antimicrobial may be selected from the list of microbicides discussed in the catalog "Metalworking", Buckman Laboratories, Inc., 2010, which is herein incorporated by reference in its entirety. In a further embodiment, the antimicrobial is the Busan® 1060 reagent (Buckman Laboratories). Other examples of suitable antimicrobials are the KATHON™ 886 MW product and KATHON™ 893 MW product (Dow Chemical Company).

By the term "quenching specifications" is meant the specifications for viscosity, quenching speed, changes in cooling curves, and solids content. These specifications are specific to the quenching bath fluid or quenching spray fluid used; and are identified by the manufacturers.

By referring to a bath or spray as "outside of its quenching specifications" means that the quenching bath or spray is causing inefficient cooling, damage to the metal substrate, or has increased in viscosity so that the metal being quenched is damaged or deformed, or otherwise not optimally treated.

It should be understood that while various embodiments in the specification are presented using "comprising" language, under various circumstances, a related embodiment is also be described using "consisting of" or "consisting essentially of" language.

It is to be noted that the term "a" or "an", refers to one or more, for example, "an aqueous quenching fluid," is understood to represent one or more quenching fluids. As such, the terms "a" (or "an"), "one or more," and "at least one" are used interchangeably herein.

Unless defined otherwise in this specification, technical and scientific terms used herein have the same meaning as commonly understood by one of ordinary skill in the art to which this invention belongs and by reference to published texts, which provide one skilled in the art with a general guide to many of the terms used in the present application.

The Quenching and Recycling Process
(a) Quenching Bath

In one embodiment, a process for increasing the efficiency of a metal quenching bath, comprises the following steps, including providing in a container or quenching tank an aqueous metal quenching bath. Generally, metal or metal substrates enter the quenching bath at temperatures as high as 1600° C. While the bath is being used for quenching, the bath temperature is kept about 100° F. and 120° F. (i.e., 37.7° C. and 48.9° C.) to keep the quenching fluid at its desired quenching temperature. After the aqueous quenching bath has been used to quench metal, examination of its quenching specifications can show the bath to no longer be within the quenching specification. This means that the bath contains sufficient contamination with the water insoluble, fire resistant hydraulic fluid that the bath is no longer performing acceptably.

This contaminated bath is treated by heating the bath to a temperature in the range of 105 and 200° F. (i.e., 40.5° C. to 93.3° C.) with agitation for a sufficient time to cause the aqueous quenching fluid phase to separate from the hydraulic fluid phase. In another embodiment, the bath is heated to a temperature in the range of 110 to 190° F. (i.e., 43.3° C. to 87.7° C.). In another embodiment, the bath is heated to a temperature of in the range of 150 to 180° F. (i.e., 65.5° C. to 82.2° C.). In another embodiment, the bath is heated to a temperature in the range of 120 to 175° F. (i.e., 48.8° C. to 79.4° C.). In still other embodiments, the temperature is in degrees Fahrenheit at least 105, 106, 107, 108, 109, 110, 111, 112, 113, 114, 115, 116, 117, 118, 119, 120, 121, 122, 123, 124, 125, 126,127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, to at least 200. In Celsius, these temperatures range from 40.5 to 93.3 degrees.

This heating is accompanied by agitation of the contaminated bath. The bath may be agitated at a rate of about 1 and 1000 rpms, depending upon the size of the container in which the bath resides. In another embodiment, the range is 1 to 500 rpms. In another embodiment, the bath is agitated at rpms of at least 50, 100, 150, 200, 250, 300, 350, 400, 450 or 500, or any number therebetween. One of skill in the art may readily select a suitable agitation rate, taking into consideration the teachings of this specification.

The heating and agitation of the contaminated bath is desirably conducted for about 5 minutes and 12 hours. Preferably the shorter the time period, the more desirable the process is for industrial use. In one embodiment a suitable time is about 10 minutes and 20 hours. In another embodiment, a suitable time is about 15 minutes and 12 hours. In another embodiment, a suitable time is about 15 minutes and 1 hour or about 1 to 3 hours. In still other embodiments, the time for heating and agitation is at least 5, 10, 15, 20, 25, 30, 35, 40, 45, 50, 55 or 60 minutes or any time period therebetween. In still other embodiments, the time for heating and agitation is at least 1, 1.5, 2.5, 3, 3.5, 4, 4.5, 5, 5.5, 6, 6.5, 7, 7.5, 8, 8.5, 9, 9.5, 10, 10.5, 11, 11.5 or up to 12 hours, or any time period therebetween.

In one embodiment, the heating step is accomplished at about 150 and 180° F. for 15 minutes to 3 hours, using an agitation rate of about 1 and 500 rpm. Still other combinations of temperature, time and agitation rate within the parameters described herein may be selected by one of skill in the art, taking into consideration the teachings of this specification, e.g., such as 160-170° F. for about 1 hour at 400 rpm, or 170-180° F. for about 2 hours at 300 rpm, etc., depending upon factors such as size of tank, volume of quenching fluid, size of metal substrate, etc.

Depending primarily upon the size of the quenching bath and hydraulic fluid equipment, this heating step may occur in the quenching tank in situ. Alternatively the bath is removed to a first collection tank where the heating process takes place.

Following the heating process, the resulting uncontaminated aqueous quenching bath phase is removed or drained or pumped from the lower portion of the quenching tank or collection tank in which it was heated and returned to a functional quenching bath. In one embodiment of this method, the recovered aqueous quenching bath is cooled to a suitable temperature (e.g., in the range of about 105, 110, or 115° F.) before reintroducing it into the functional quenching bath. In another embodiment of this process, the concentration or components of the recovered aqueous quenching bath phase is adjusted before reintroducing it into the functional quenching bath. Such adjustment may include the addition of one or more polymers to the recovered aqueous phase or the addition of more water or additives. Such adjustment is within the skill of the art, given the teachings of this specification. Optionally, the hydraulic fluid phase following separating may be recovered from the quenching tank or collection tank in which it was heated and sent for reuse as a fuel, e.g., biofuel or hydraulic oil thus increasing the economic efficiency of the process. In one embodiment, the process involves comprising skimming the hydraulic fluid phase from the top of the tank after heating into a second collection tank or decanting or pumping the hydraulic fluid phase from the first collection tank into a second collection tank for transit.

(b) Quenching Spray

In one embodiment, a process for increasing the efficiency of a metal spray quenching, comprises the following steps, including collecting, in a first collection tank in association with a quench barrel or quench ring, used metal aqueous quenching fluid after the fluid has been sprayed onto heated metal. Generally, metal or metal substrates enter the quenching ring or quench barrel at temperatures as high as 1600° C. While the spray is being used for quenching, the spray temperature is kept between about 100° F. and 120° F. (i.e., 37.7° C. and 48.9° C.) to keep the quenching fluid at its desired quenching temperature. After the aqueous quenching spray has been used and collected as it drips off the metal or the quench ring or barrel, examination of its quenching specifications can show the used spray fluid to no longer be within the quenching specification. This means that the spray fluid contains sufficient contamination with the water insoluble, fire resistant hydraulic fluid that the used spray fluid can no longer perform acceptably.

This used contaminated spray fluid is treated by heating the fluid in the first collection tank to a temperature in the range of 105 and 200° F. (i.e., 40.5° C. to 93.3° C.) with agitation for a sufficient time to cause the aqueous quenching fluid phase to separate from the hydraulic fluid phase. In another embodiment, the used spray fluid in the first collection tank is heated to a temperature in the range of 110 to 190° F. (i.e., 43.3° C. to 87.7° C.). In another embodiment, the used spray fluid is heated to a temperature of in the range of 150 to 180° F. (i.e., 65.5° C. to 82.2° C.). In another embodiment, the used spray fluid is heated to a temperature in the range of 120 to 175° F. (i.e., 48.8° C. to 79.4° C.). In still other embodiments, the temperature is one of the degrees Fahrenheit or Celsius as specified or listed in part (a) above referring to the heating of the quenching bath.

The heating of the used spray fluid is accompanied by agitation in the first collection tank. The tank may be agitated at a rate of about 1 and 1000 rpms, depending upon the size of the collection tank. In another embodiment, the range is 1 to 500 rpms. In another embodiment, the contents of the collection tank are agitated at rpms of at least 50, 100, 150, 200, 250, 300, 350, 400, 450 or 500, or any number therebetween. One of skill in the art may readily select a suitable agitation rate, taking into consideration the teachings of this specification.

The heating and agitation of the contaminated spray fluid in the first collection tank is desirably conducted for about 5 minutes and 12 hours. Preferably the shorter the time period, the more desirable the process is for industrial use. In one embodiment a suitable time is about 10 minutes and 20 hours. In another embodiment, a suitable time is about 15 minutes and 12 hours. In another embodiment, a suitable time is about 15 minutes and 1 hour or about 1 to 3 hours. In still other embodiments, the time for heating and agitation is the same as specified or listed in part (a) above referring to the time periods applied to the quenching bath. In one embodiment, the heating step is accomplished at about 150 and 180° F. for 15 minutes to 3 hours, using an agitation rate of about 1 and 500 rpm. Still other combinations of temperature, time and agitation rate within the parameters described herein may be selected by one of skill in the art, taking into consideration the teachings of this specification, e.g., such as 160-170° F. for about 1 hour at 400 rpm, or 170-180° F. for about 2 hours at 300 rpm, etc., depending upon factors such as the amount or volume of collected used quenching spray fluid, the size of the collection tank, size and temperature of metal substrate at the time of spraying, etc.

Following the heating process, the resulting uncontaminated aqueous quenching spray phase is removed or drained or pumped from the lower portion of the collection tank in which it was heated and returned to a functional quenching spray fluid or to a tank or container holding the functional spray fluid. In one embodiment of this method, the recovered aqueous quenching spray fluid is cooled to a suitable temperature (e.g., in the range of about 105, 110, or 115° F.) before reintroducing it into the functional quenching spray. In another embodiment of this process, the concentration or components of the recovered aqueous quenching phase is adjusted before reintroducing it into the functional quenching spray. Such adjustment may include the addition of one or more polymers to the recovered aqueous phase or the addition of more water or additives. Such adjustment is within the skill of the art, given the teachings of this specification.

Optionally, the hydraulic fluid phase following separating may be recovered from the first collection tank in which it was heated and sent for reuse as a fuel, e.g., biofuel or hydraulic oil thus increasing the economic efficiency of the process. In one embodiment, the process involves comprising skimming the hydraulic fluid phase from the top of the tank after heating into a second collection tank or decanting or pumping the hydraulic fluid phase from the first collection tank into a second collection tank for transit.

(c) Other Process Modifications

These processes of using the quenching bath or quenching spray may be further modified by employing a heat pump to recycle heat or energy by using the heat generated from the initial quenching to provide heat or energy for heating the collection tanks, or by using the heat generated from the heated collection tank as energy to cool the quenching bath tank, or as energy for pumping the fluids from one tank to another.

In yet further embodiments, the processes include a step of periodically flushing the collection tanks to remove solid residue, which residue enters the waste process. However, because the quenching fluid and hydraulic fluid in these processes can be recycled, the amount of materials sent for waste treatment is considerably reduced.

In yet a further embodiment, each process includes an additional step of subjecting the recovered aqueous quenching bath phase or aqueous quenching spray phase from the tank or container in which it is heat treated and then separated from the oil phase, to a filtration or ultrafiltration step prior to returning the aqueous phase to the functional quenching bath or functional quenching spray. Filtration or ultrafiltration occurs prior to or after any optional cooling or other treatment of the separated aqueous phase. The ultrafiltration step removes any residual oil that may be in the quenchant. In one embodiment, the ultrafilter is used to accelerate separation of the hydraulic fluid phase from the aqueous phase. As one example, the ultrafiltration step is used immediately after or within minutes of the heating step to remove any remaining unseparated hydraulic fluid from the aqueous phase. This step may be optionally employed before cooling or further treatment of the aqueous phase separated by heating from the hydraulic oil phase. In other embodiments, the ultrafiltration or filtration step is optionally employed after cooling to a temperature suited to the filtration material. In yet another embodiment, a filtration step is optionally employed before the step of adjusting the concentration or components of the recovered aqueous quenching phase prior to reintroducing the aqueous quenching phase into the functional quenching bath or functional quenching spray, as discussed above.

As described herein, the process may occur in situ in the quenching bath tank. In another embodiment, the process, either the quenching spray process or the bath process, may be a continuous process driven by suitable programs and associated computer processors to continuously recycle the components of the contaminated quenching fluid. In still another aspect, the process may be a batch process that is initiated periodically.

The processes of the present invention are performed using conventional metal quenching bath equipment or quenching spray equipment. One of skill in the art would readily be able to select suitable quenching equipment for use in quenching the selected metal, taking into consideration the teachings of this specification. The hydraulic equipment utilized in metal quenching serves a variety of purposes and can be selected similarly by one skilled in the art, taking into consideration the teachings of this specification.

Advantageously, by recycling the aqueous quenching bath fluid and/or spray fluid, and providing only the hydraulic fluid phase for waste oil or fuel, such as biofuels, among others, considerable costs are saved. In one embodiment, it will be necessary for the customer to purchase only a fraction of the aqueous quenching bath fluid or spray fluid as employed in prior art processes. In another embodiment, it will be necessary for the customer to purchase only a fraction of the hydraulic fluid previously used.

Not only does this reduce the quenching costs for the customer, but considerably less waste is produced. This reduction in waste has several advantages. In one embodiment, because one or both of the aqueous quenching bath or spray fluid or hydraulic fluid are re-used, less water, which is the most expensive part of the waste treatment process, is required to treat the waste. This reduction of water required to treat the waste is also environmentally advantageous, i.e., water consumption is reduced for the customer. Adding to this environmental advantage is the reduction of waste which may be buried in landfills or released into public waters. In one embodiment, the amount of water utilized to treat waste generated from the processes of the present invention is considerably less than the amount of water utilized to treat waste generated from a process for quenching a metal using a water-soluble hydraulic fluid.

In another embodiment, the amount of water utilized in the waste treatment step is at least 2-, 3-, 4-, 5-, 6-, 7-, 8-, 9-, 10-, 11-, 12-, 13-, 14-, 15-, 16-, 17-, 18-, 19-, or 20-fold less than the amount of water utilized to treat waste generated from a conventional process for quenching a metal using a water-soluble hydraulic fluid. In some embodiments, the fold of water saved directly correlates with the number of times the original and used aqueous quenching bath fluid and/or spray fluid is recycled through the quenching process.

The Quenching and Recycling Systems

Also provided by the present invention are systems for quenching a metal. Each embodiment of the system simplistically includes certain equipment known for use in quenching processes, i.e., a quenching bath tank for immersion of heated metals or a quenching ring or quenching barrel for spray quenching processes, and including the hydraulic equipment, collection tanks, quenching tank, filters, pumps, and conduits connecting the same. In one embodiment, a quenching and recycling system for use in metal or metal alloy quenching comprises a quenching tank for the immersion of a heated or super-heated metal or metal alloy substrate, wherein the tank is designed to contain an aqueous quenching bath which meets its required quenching specification. Also part of the system is hydraulic equipment associated with the tank which uses water-insoluble, fire-resistant hydraulic fluid. Additional components include an agitation device for agitating the quenching tank; and a heater or heat pump to cool the quenching bath in the quenching tank, which increases in temperature during the quenching process. As stated above, during use the aqueous quenching bath in the quenching tank becomes contaminated with the water insoluble, fire resistant hydraulic fluid, which leaks into the bath via the hydraulic equipment.

In one embodiment of the system and processes described herein, the quenching and recycling system for use in metal or metal alloy quenching comprises the following components. Generally, the quenching is performed in a quenching bath tank. If the process in performed in situ, i.e., using the quenching bath tank itself, the system is simple. In addition to the quenching tank, a heater or heating element is associated with the tank, which is capable of heating the quenching tank to a temperature of about 105 and 200° F. for about 15 minutes to 12 hours, to perform the heating step described.

Additionally an agitation device for agitating the tank during the heating step is part of this system. It is anticipated that an in situ system may use the same temperature controller or heating element that cools the quenching tank during use and the same agitation device that agitates the quenching bath during use. The in situ system can have associated with it a skimmer to remove the hydraulic oil phase from the top of the tank, or a conduit through which the hydraulic oil phase is transported or pumped from the top of the tank to a separate collection tank for transportation to a hydraulic oil recycling plant or another site for use as a fuel.

In one embodiment, the recycled aqueous phase with the contaminating hydraulic oil phase removed, remains in the quenching tank, which is supplemented with additional aqueous quenchant fluid components or additional new aqueous quenchant to a suitable volume and then reused as a quenching bath. In another embodiment, this in situ system may have a conduit placed at its base associated with an optional pump to move the recovered aqueous phase out of the quenching tank to a collection tank, for cooling or concentration adjustment (e.g., additional of quenchant fluid components). The second collection tank may then be associated with a conduit associated with an optional pump to move the cooled, or concentrated, recycled aqueous fluid back into the quenching bath tank.

In another embodiment, a quenching and recycling system for use in metal or metal alloy quenching comprises the following components. The description of the various embodiments of the quenching and recycling systems can be seen schematically from a view of FIGS. 2-3.

A quenching bath tank 10 having a first conduit 20 associated with a pump to move the contaminated aqueous quenching fluid which does not meet its quenching specifications to an adjacent first collection tank 30. Other elements of this system are a heater capable of heating the first collection tank 30 to a temperature of about 105 and 200° F. for about 15 minutes to 12 hours and an agitation device for agitating the collection tank 30 to perform the phase separation described in the process above. In one embodiment, a conduit 40 exits the lower portion of the first collection tank 30 and connected to the quenching tank 10 for return of the aqueous quenching bath phase directly to the quenching tank 10. Conduit 40 is optionally associated with a pump to perform such transfer.

In one embodiment, the first collection tank 30 is associated with a skimmer to remove or decant the hydraulic oil phase from the top of the first collection tank 30 to collection tank 50 which is used to transport the recovered hydraulic oil phase for reuse as fuel, e.g., biofuel or hydraulic oil.

In another embodiment, a conduit 60 is positioned on the upper portion of the first collection tank 30 to pump the hydraulic oil phase from the top of the first collection tank 30 to collection tank 50 for transportation to a hydraulic oil recycling plant or another site for use as a fuel, e.g., biofuel.

In yet another embodiment, a conduit 70 is connected from collection tank 30 to collection tank 80, into which the recovered aqueous quenching bath phase is pumped or transported for cooling to a suitable temperature, e.g., about 105 to 110° F. and/or for concentrating the recovered aqueous quenching bath, e.g., adding or adjusting the quenching fluid components. A fourth conduit 90 exits the cooling and/or concentrating tank 80 to transport this cooled and/or concentrated recycled aqueous quenching bath back to the functional quenching bath tank 10. In yet another embodiment (not shown), the concentrating tank can be a separate tank connected to tank 80 by another conduit and to the quenching tank by a further conduit.

Collection tank 50 is present in any embodiment of these systems, as it is used to transport the recovered hydraulic oil phase from the separation tank 30 for reuse as fuel, e.g., biofuel or hydraulic oil.

Finally, it is anticipated that any embodiment of the system will contain conventional apparatus for rinsing the various tanks, particularly the separation tank 30 of solids (i.e., blow-down) and conduits, e.g., 100, directing the rinsed material to disposal as waste.

In yet another embodiment, a quenching and recycling system (FIG. 8) for use in metal or metal alloy quenching, comprises a quench barrel or quench ring 200 designed to apply an aqueous quenching spray onto a heated metal or metal alloy substrate as it passes through the barrel or ring. The quenching spray meets required quenching specifications and optionally is applied through the barrel or quench ring from a functional quenching spray tank 210 via a conduit 220. Hydraulic equipment associated with the quench barrel or quench ring uses water-insoluble, fire-resistant hydraulic fluid, and during use the quenching spray becomes contaminated with the water-insoluble, fire resistant hydraulic fluid. The barrel or ring 200 is associated with an optional first conduit 230 associated with a pump to move the contaminated and used aqueous quenching spray fluid which does not meet its quenching specifications from the barrel or ring or collected from the sprayed metal to an adjacent first collection tank 300 which collects used aqueous quenching spray following its application onto the metal substrate. Other elements of this system are a heater capable of heating the first collection tank 300 to a temperature of about 105 and 200° F. for about 15 minutes to 12 hours and an agitation device for agitating the collection tank 300 to perform the phase separation described in the process above. In one embodiment, a conduit 340 exits the lower portion of the first collection tank 300 and is connected to the functional quenching spray tank 210 for return of the aqueous quenching phase directly to the quenching spray tank 210. Conduit 220 is optionally associated with a pump to perform such transfer. Optionally, a second conduit 260 removes the hydraulic oil fluid phase to another collection tank 250 for reuse as fuel or hydraulic oil. The dotted line 270 is a conduit for the waste stream.

In one embodiment, the first collection tank 300 is associated with a skimmer to remove or decant the hydraulic oil phase from the top of the first collection tank 300 to collection tank 250 which is used to transport the recovered hydraulic oil phase for reuse as fuel, e.g., biofuel or hydraulic oil. In another embodiment, a conduit 260 is positioned on the upper portion of the first collection tank 300 to pump the hydraulic oil phase from the top of the first collection tank 300 to collection tank 250 for transportation to a hydraulic oil recycling plant or another site for use as a fuel, e.g., biofuel.

As described above in association with the quenching bath embodiment, an embodiment of the quenching spray system includes a cooling tank connected to the second conduit, wherein the recovered aqueous quenching spray phase is transported for cooling and a fourth conduit exiting the cooling tank to transport the recovered cooled aqueous quenching spray phase to the functional quenching spray tank.

As described above in association with the quenching bath embodiment, an embodiment of the quenching spray system includes a second collection tank connected to the second conduit, wherein the recovered aqueous quenching spray fluid is transported for concentrating the recovered aqueous quenching phase and a fifth conduit exiting the second collection tank to transport the recovered concentrated aqueous quenching spray phase to the functional quenching spray tank.

As described above in association with the quenching bath embodiment, another embodiment of the quenching spray system includes a third collection tank, which receives the hydraulic fluid phase which is skimmed or decanted from the top of the first or second collection tank. As described above in association with the quenching bath embodiment, another embodiment of the quenching spray system includes a sixth conduit for draining the hydraulic fluid phase from the second collection tank after the quenching spray phase has been removed. As described above in association with the quenching bath embodiment, another embodiment of the quenching spray system includes a heat pump positioned to recycle or transfer heat or energy from the heated collection tank to the quenching spray tank. As described above in association with the quenching bath embodiment, another embodiment of the quenching spray system includes a first pump to pump the contaminating quenching spray fluid and hydraulic oil into the first collection tank and a second pump to pump the recycled quenching spray phase from the first collection tank to the quenching spray tank. As described above in association with the quenching bath embodiment, another embodiment of the quenching spray system includes a filtration or ultrafiltration membrane positioned in the first collection tank or interposed between the first collection tank and the second conduit and/or a filtration or ultrafiltration membrane positioned in the second collection tank or interposed between the second cooling collection tank and the fourth conduit.

The quenching spray system in one embodiment is designed for continuous operation. The quenching spray system in another embodiment is designed for a discontinuous or batch process.

Still other embodiments of the quenching bath system or quenching spray system include a heat pump positioned to recycle heat or energy from the heated collection tanks to cool the functional quenching bath in the quenching tank or the functional quenching spray tank to run the pumps necessary for transporting the fluids from one tank to another through the conduits of the system. Still other embodiments may include programmed controllers to run the quenching and recycling system continuously or as a discontinuous or batch process.

It is also contemplated that one or more pumps can be positioned before or along any of the above-mentioned conduits to facilitate transport, e.g., removal of the contaminated quenching fluid from the quenching bath tank 10 into the collection tank 30, along conduit 40 to facilitate removal of the aqueous quenching phase from the collection tank 30 back to the quenching bath 10 or to and from the analogous tanks described for the spray system. In another embodiment, a pump can be positioned before or along conduit 70, when the recycled aqueous phase of the collection tank 30 is transported for cooling and/or concentration in tank 80 prior to return via conduit 90 to the quenching bath 10. As discussed above, the pump selected can be determined by one skilled in the art and may include one or more gears or centrifugal pumps.

All conduits utilized in the systems must be resistant to wear of the chemicals utilized in the system. In one embodiment, the conduits in the system must be resistant to corrosion, growth of bacteria, clogging, among others. Those skilled in the art of quenching would readily be able to select conduits meeting these requirements, taking into consideration the teachings of this specification. See, i.e., the conduits described in Vinarcik and the ASM Handbook cited above, which are herein incorporated by reference.

In yet further embodiments, the systems include a filtration membrane or ultrafilter apparatus interposed between the conduit exiting the tank in which the contaminated fluid is heated to obtain phase separation and before the aqueous phase is reintroduced into the functional quenching tank, e.g., as shown in FIG. 6. In one embodiment, a filtration or ultra-filtration membrane or ultrafilter apparatus is placed in, or adjacent to the recycle process tank used for the heating and separation of the hydraulic fluid so that the conduit exiting the heating tank sends the separated aqueous phase through the ultrafilter. The filtered aqueous phase is then recycled into the functional quenching tank. Any materials that did not pass through the filter are recycled back into the heating tank for further separation.

In yet another embodiment, the system includes a separate aqueous process tank for collection of the aqueous phase from the heating tank, while the recoverable hydraulic oil phase exits the heating tank in which the contaminated fluid is heated to obtain phase separation for collection or use as fuel as described above. The aqueous phase is collected in the aqueous process tank and then pumped through a filtration membrane or ultrafilter apparatus positioned after the conduit exiting the aqueous collection tank and before the aqueous phase is reintroduced into the functional quenching tank, e.g., as shown in FIG. 7 (and as exemplified in Example 8). In this embodiment, the filtration/ultrafiltration membrane is selected to be compatible with the temperature of the quenching fluid after being heated. The filtered aqueous phase is then recycled into the functional quenching tank. Any materials that did not pass through the filter are recycled back into the aqueous process tank for further filtration or exit the aqueous process tank as recoverable hydraulic oil phase to join the recoverable hydraulic oil phase exiting the heating tank.

In all of the above embodiments, the filtration/ultrafiltration membrane is selected to be compatible with the temperature of the quenching fluid after being heated.

In yet other embodiments, a filtration or ultra-filtration membrane is placed in the recycle system following any optional cooling of the heated and separated aqueous phase. For example, a filtration or ultrafiltration membrane is placed in the tank or in the conduit exiting the tank in which the aqueous phase is cooled, prior to any adjustment in concentration or contents of the aqueous phase, prior to reintroduction into the functional quenching tank. The quenching fluid could also be cooled to be within the membrane's temperature limitations.

One of skill in the art given the teachings of this specification may also place the ultrafiltration system in other portions of the recycle process of, e.g., FIG. 6 or 7, or in modified recycle process with other steps (e.g., cooling or reconcentrating steps) as described herein.

Depending upon its location and the temperature of the aqueous phase or fluid which is contacting the filtration or ultrafiltration membrane, the composition of the membrane will be selected from among many commercially available membranes and ultrafiltration membranes known by those of skill in the art. For example, if the temperature of the fluid is above 120° F. (i.e., the ultrafiltration membrane is used in or just after the fluid exits the heating tank), a ceramic membrane is employed. If the temperature is below 120° F. (i.e., if the ultrafiltration membrane is used in or just after the cooling tank), then a polymeric membrane of the polyacrylonitrile (PAN) or polyvinylidene fluoride (PVDF) chemistry (or ceramic) is used. In still other embodiments, once the aqueous phase of the recycled quenchant has been recovered by the ultrafilter, the quenchant concentration is measured. Optionally, the quenchant concentration or components are adjusted, prior to reintroduction into the functional quenching tank.

Part of this recycle system with or without the ultrafiltration membrane described above are other filters placed in the system. In an effort to ensure that any solid material which accumulates or is produced in the collection tanks does not clog one or more of the conduits in the system, filters are optionally included in the system. In one embodiment, one or more filters are optionally included at any point in the system to ensure free flow of the liquids of the system through the conduits. One of skill in the art would be able to select a suitable filter for use herein, taking into consideration the teachings of this specification. In one embodiment, the filter is a screen or filter such as a coarse filter. In another embodiment, the filter is a 20 micron nominal filter. The filter size and porosity may be selected by one of skill in the art given this disclosure and considering the physical requirements of the metals involved in the process. Any solid material collected in the filter is then transferred to a solid waste tank. In one embodiment, this is performed manually. In another embodiment, the solid is dumped out of the filter via automation.

The type and size of the collection tanks may be selected and determined by one of skill in the art, taking into consideration the teachings of this specification. See, e.g., the collection tanks described in Vinarcik and the ASM Handbook cited above, which are herein incorporated by reference.

Clearly, one of skill in the art may modify the above systems and processes, such as by automation, computer processing, adjusting the size and lengths of tanks, conduits, placement of pumps and the like. Such modifications are within the skill of the art given this disclosure.

While converting a current process or system utilizing water-soluble hydraulic fluids to a process or system utilizing water-insoluble hydraulic fluids entail costs, there is a long term economic and environmental benefit to making this conversion. The entire "wetting system", includes the sections of the system which come into contact with the previous hydraulic fluid and aqueous quenching fluid. Such conversion would involve drainage of the existing equipment, including collection tanks, hydraulic equipment, collection tanks, filters, pumps, conduits connecting the same, among others. Drainage can be accelerated by the use of pumps or vacuums, as determined by one skilled in the art given this specification. In one embodiment, all of the valves in the wetting system are opened and the fluids collected therefrom are discarded. After closing the valves, a neutral mineral oil, or the like, is flushed through the system, the valves are opened, and the mineral oil collected therefrom is discarded. Finally, the valves are closed, the system is flushed with the water-insoluble hydraulic fluid, the valves are opened, and the water-insoluble hydraulic fluid collected is discarded. In one embodiment, the system is rinsed with the hydraulic fluid at least once prior to having the system operate on the water insoluble hydraulic fluid. In another embodiment, the system is rinsed with the hydraulic fluid at least 2, 3, 4, or 5 times prior to operation. Obviously, one skilled in the art, given this specification, will be able to determine the number of hydraulic fluid rinses as determined by types of hydraulic fluid previously used and the incoming hydraulic fluid.

The following examples are illustrative of the claimed methods only and are not intended to limit the present invention.

EXAMPLES

The following examples demonstrate the effects of the process or system separation step of a water glycol-based aqueous quenching fluid, e.g., Houghton Aqua Quench® 4000 aqueous quenching fluid or Houghton Aqua Quench® 365 aqueous quenching fluid, when contaminated with a water insoluble hydraulic fluid as would occur during the metal quenching process. The exemplary water insoluble hydraulic fluid is Cosmolubric® B-230.

Aqua-Quench 365 is a polyalkylene glycol (PAG) based quenchant concentrate providing quenching speeds between those of oil and water, with a nitrite free corrosion inhibitor system. Its physical properties are provided in Table 1 below.

TABLE 1

| Test | Typical Value |
|---|---|
| Concentrate | |
| Appearance | Translucent pale brown fluid |
| Specific Gravity at 15.6° C. | 1.080 |
| Kinematic Viscosity 40° C. | 350 cSt |

TABLE 1-continued

| Test | Typical Value |
|---|---|
| Diluted Solutions | |
| Appearance | Translucent pale amber fluid |
| Kinematic Viscosity 40° C. | |
| 10% | 2.0 cSt |
| 20% | 4.50 cSt |
| 30% | 9.2 cSt |
| pH 30% solution | 9.5 |
| Specific Heat | 0.95 cal/gm/° C. |

Aqua-Quench 4000 is a PVP/VPC based quenchant concentrate providing quenching speeds between those of oil and water with a nitrite free corrosion inhibitor system. This type of quenchant is described in detail in International Patent Application Publication No. WO/US2012/134982, incorporated by reference herein. Its physical properties are provided in Table 2 below.

TABLE 2

| Test | Typical Value |
|---|---|
| Concentrate | |
| Appearance | Slightly hazy, amber fluid |
| Specific Gravity at 15.6° C. | 1.0270 |
| Kinematic Viscosity 40° C. | 43 cSt |
| Diluted Solutions | |
| Appearance | Translucent pale amber fluid |
| Kinematic Viscosity 40° C. | |
| 10% | 1.35 |
| 20% | 2.23 |
| 30% | 3.65 |
| pH 30% solution | 9.5 |
| Specific Heat | |

Cosmolubric® B-230, as discussed above, is an ISO 68 vegetable oil based Factory Mutual approved fire-resistant hydraulic fluid, which is also biodegradable.

Example 1

In a 500 mL jar, 285 mL of reverse osmosis water (70-75° F. or 21-24° C.) was added. To this, 15 mL of Houghton Aqua Quench® 4000 (aqueous quenching product) was added (70-75° F.). The jar was shaken for 15 seconds to mix (comparable to a 500-1000 rpm). To this, 15 mL of Houghton Cosmolubric® B-230 (water insoluble hydraulic fluid) was added (70 -75° F.). The mixture was then shaken for 15 seconds and then left to sit undisturbed for 4 hours. Within 30 seconds, the mixture started to show two separate phases; a bottom aqueous phase and a top, water insoluble phase. The clarity of the bottom, aqueous phase was monitored every 5 minutes for the first 30 minutes, and then every 30 minutes thereafter. After 30 minutes the aqueous phase was still very hazy. At the end of 4 hours the aqueous sample was still hazy.

This hazy sample would be inadequate for use as an aqueous quenching fluid to recycle back into a quenching bath. Haziness is indicative of some residual contamination with hydraulic fluid. Thus, these separation conditions were not acceptable for the separation step of the process using the products identified above, i.e., the PVP/VPC based quenchant and the vegetable oil hydraulic fluid.

Example 2

In a 500 mL jar, 285 mL of reverse osmosis water (70-75° F.) was added. To this, 15 mL of Houghton Aqua Quench® 365 (aqueous quenching product) was added (70-75° F.). The jar was shaken for 15 seconds to mix (comparable to a 500-1000 rpm). To this, 15 mL of Houghton Cosmolubric® B-230 (water insoluble hydraulic fluid) was added (70-75° F.). The mixture was then shaken for 15 seconds and then left to sit undisturbed for 4 hours. Within 30 seconds, the mixture started to show two separate phases; a bottom aqueous phase and a top, water insoluble phase. The clarity of the bottom, aqueous phase was monitored every 5 minutes for the first 30 minutes, and then every 30 minutes thereafter. After 30 minutes the aqueous phase was still very hazy. At the end of 4 hours the aqueous sample was still very hazy.

This hazy sample would be inadequate for use as an aqueous quenching fluid to recycle back into a quenching bath. Haziness is indicative of some residual contamination with hydraulic fluid. Thus, these separation conditions were not acceptable for the separation step of the process using the products identified above, i.e., the polyalkylene glycol based quenchant and the vegetable oil hydraulic fluid.

Example 3

A 600 mL beaker was placed on a hot/stirrer plate and 380 mL of reverse osmosis water was added, along with a 2.5" stir bar. The stirrer was turned on and the stirrer setting was set to 400 rpm. To the mixing water, 20 mL of Houghton Aqua Quench® 4000 quenching fluid was added and the mixture was allowed to mix for 5 minutes. 20 mL of Houghton Cosmolubric® B-230 hydraulic fluid was then added to the beaker and the mixture was allowed to mix. The heat setting of the hot/stir plate was set to 100° C. The sample was left to mix and increase in temperature until a fluid temperature of 105° F. was reached. At this point, the heat and stirring was stopped and the sample was left to sit, undisturbed. Within 30 seconds, the mixture started to show two separate phases; a bottom aqueous phase and a top, water insoluble phase. The clarity of the bottom, aqueous phase was monitored every 5 minutes for the first 30 minutes, and then every 30 minutes thereafter. The bottom aqueous phase was clear after 30 minutes and remained clear as long as the sample was undisturbed.

The aqueous quenching phase could be removed and the aqueous quenching fluid would be suitable for reintroduction into a quenching bath because the clarity indicated that the fluid was sufficiently uncontaminated to achieve quenching specifications. Thus, these separation conditions were acceptable for the separation step of the process using the products identified above, i.e., the PVP/VPC based quenchant and the vegetable oil hydraulic fluid.

Example 4

A 600 mL beaker was placed on a hot/stirrer plate and 380 mL of reverse osmosis water was added, along with a 2.5" stir bar. The stirrer was turned on and the stirrer setting was set to 400 rpm. To the mixing water, 20 mL of Houghton Aqua Quench® 365 quenching fluid was added and the mixture was allowed to mix for 5 minutes. 20 mL of Houghton Cosmolubric® B-230 hydraulic fluid was then added to the beaker and the mixture was allowed to mix. The heat setting of the hot/stir plate was set to 100° C. The sample was left to mix and increase in temperature until a fluid temperature of 105° F. was reached. At this point, the heat and stirring was stopped and the sample was left to sit, undisturbed. Within 30 seconds, the mixture started to show two separate phases; a bottom aqueous phase and a top, water insoluble phase. The clarity of the bottom, aqueous phase was monitored every 5 minutes for the first 30 minutes, and then every 30 minutes thereafter. The bottom aqueous phase was hazy at 30 minutes and remained hazy at 4 hours.

This hazy sample would be inadequate for use as an aqueous quenching fluid to recycle back into a quenching bath. Haziness is indicative of some residual contamination with hydraulic fluid. Thus, these separation conditions were not acceptable for the separation step of the process using the products identified above, i.e., the polyalkylene glycol based quenchant and the vegetable oil hydraulic fluid.

Example 5

A 600 mL beaker was placed on a hot/stirrer plate and 380 mL of reverse osmosis water was added, along with a 2.5" stir bar. The stirrer was turned on and the stirrer setting was set to 400 rpm. To the mixing water, 20 mL of Houghton Aqua Quench® 4000 was added and the mixture was allowed to mix for 5 minutes. 20 mL of Houghton Cosmolubric® B-230 was then added to the beaker and the mixture was allowed to mix. The heat setting of the hot/stir plate was set to 100° C. The sample was left to mix and increase in temperature until a fluid temperature of 150° F. was reached. At this point, the heat and stirring was stopped and the sample was left to sit, undisturbed. Within 30 seconds, the mixture started to show two separate phases; a bottom aqueous phase and a top, water insoluble phase. The clarity of the bottom, aqueous phase was monitored every 5 minutes for the first 30 minutes, and then every 30 minutes thereafter. The bottom aqueous phase was clear after 20 minutes and remained clear as long as the sample was undisturbed.

Thus, after this separation process, the aqueous quenching phase was sufficiently free of contamination that it could be removed and would be suitable for reintroduction into a quenching bath to meet quenching specifications. Thus, these separation conditions were acceptable for the separation step of the process using the products identified above, i.e., the PVP/VPC based quenchant and the vegetable oil hydraulic fluid.

Example 6

A 600 mL beaker was placed on a hot/stirrer plate and 380 mL of reverse osmosis water was added, along with a 2.5" stir bar. The stirrer was turned on and the stirrer setting was set to 400 rpm. To the mixing water, 20 mL of Houghton Aqua Quench® 365 aqueous quenching fluid was added and the mixture was allowed to mix for 5 minutes. 20 mL of Houghton Cosmolubric® B-230 hydraulic fluid was then added to the beaker and the mixture was allowed to mix. The heat setting of the hot/stir plate was set to 100° C. The sample was left to mix and increase in temperature until a fluid temperature of 150° F. was reached. At this point, the heat and stirring was stopped and the sample was left to sit, undisturbed. Within 30 seconds, the mixture started to show two separate phases; a bottom aqueous phase and a top, water insoluble phase. The clarity of the bottom, aqueous phase was monitored every 5 minutes for the first 30 minutes, and then every 30 minutes thereafter. The bottom aqueous phase was slightly hazy at 30 minutes, slowly cleared up and was clear at 6 hours.

Thus, these separation conditions were acceptable for the separation step of the process using the products identified above, i.e., the polyalkylene glycol based quenchant and the vegetable oil hydraulic fluid.

Example 7

A 10 L tank with bottom drain was placed on a hot/stirrer plate and 7,600 mL of reverse osmosis water was added, along with a 3" stir bar. The stirrer was turned on and the stirrer setting was set to 400 rpm. To the mixing water, 400 mL of Houghton Aqua Quench® 365 quenching fluid was added and the mixture was allowed to mix for 5 minutes. 3,000 mL of this diluted product was removed for analysis (Sample 1), while 5,000 mL remained. 250 mL of Houghton Cosmolubric® B-230 (5% addition) hydraulic fluid was then added to the beaker and the mixture was allowed to mix. The heat setting of the hot/stir plate was set to 100° C. The sample was left to mix and increase in temperature until a fluid temperature of 150° F. was reached. At this point, the heat and stirring was stopped and the sample was left to sit, undisturbed. Within 30 seconds, the mixture started to show two separate phases; a bottom aqueous phase and a top, water insoluble phase. The bottom aqueous phase was slightly hazy after 4 hours and remained slightly hazy after 20 hours. 3,000 mL of the bottom, aqueous phase was removed for analysis (Sample 2).

Analysis of Samples 1 and 2 were performed to determine if the addition of the B-230 insoluble hydraulic fluid product, and subsequent removal had any effect on the product. Viscosity and cooling curve analysis were employed to determine if the quenching fluid is within its operating specifications. Results from these tests are below.

Kinematic viscosity comparison testing was performed with a Cannon-Fenske viscosity tube at 100° F. The viscosity of Sample 1 was 1.26 cSt and the viscosity of Sample 2 was 1.28 cSt. The difference between Sample 2 and Sample 1 was within the operating specifications for the Aqua Quench® 365 quenching fluid product.

IVF SmartQuench (Houghton plc, Manchester, England) comparison testing was then performed to determine the changes in the cooling characteristics of the Aqua Quench® 365 quenching fluid. The IVF SmartQuench compare report was generated by testing the samples at a medium temperature of 38° C., and an agitation rate (m/s) that was moderate (850 rpm). Table 3 below indicates the characteristics of the quenching fluid before and after contamination with the hydraulic fluid and subsequent treatment for separation therefrom.

TABLE 3

| Property | Unit | Quenching Fluid Before Contamination | Quenching Fluid After Contamination |
|---|---|---|---|
| Maximum cooling rate | ° F./sec | 354.85 | 356.15 |
| Temp at max cooling rate | ° F. | 1138.82 | 1123.43 |
| Temp at start of boiling | ° F. | 1568.75 | 1564.16 |
| Temp at start of convection | ° F. | 240.49 | 253.38 |
| Cooling Rate at 300° C. | ° F./sec | 164.07 | 158.98 |

TABLE 3-continued

| Property | Unit | Quenching Fluid Before Contamination | Quenching Fluid After Contamination |
|---|---|---|---|
| Time to 600° C. | sec | 2.68 | 2.76 |
| Time to 400° C. | sec | 3.84 | 3.92 |
| Time to 200° C. | sec | 6.38 | 6.58 |
| Theta 1[a] | ° F. | 1562.47 | 1562.97 |
| Theta 2[b] | ° F. | 456.48 | 463.91 |
| HP-IVF (Oils)[c] | | 2872.45 | 2852.35 |

[a]Theta 1 is the transition temperature from vapor phase to boiling phase.
[b]Theta 2 is the transition temperature from boiling phase to convection phase.
[c]HP-IVF (oils) is hardening power value.

Finally, FIG. 4 illustrates the cooling curves which essentially lay one on top of each other. These results indicate that the Aqua Quench® 365 (PAG) quenching product has the same cooling characteristics before contamination with the water insoluble hydraulic fluid and after contamination with, and following the process of recycling phase separation from, the B-230 water insoluble hydraulic fluid product. Thus, after these separation process conditions, the aqueous quenching phase was sufficiently free of contamination that it could be removed and would be suitable for reintroduction into a quenching bath to meet quenching specifications.

Example 8

A 10 L tank with bottom drain was placed on a hot/stirrer plate and 7,600 mL of reverse osmosis water was added, along with a 3" stir bar. The stirrer was turned on and the stirrer setting was set to 400 RPM. To the mixing water, 400 mL of Houghton Aqua Quench® 365 quenching fluid was added and the mixture was allowed to mix for 5 minutes. 3,000 mL of this diluted product was removed for analysis (Sample 1), while 5,000 mL remained. 250 mL of Houghton Cosmolubric® B-230 (5% addition) hydraulic fluid was then added to the beaker and the mixture was allowed to mix. The heat setting of the hot/stir plate was set to 100° C. The sample was left to mix and increase in temperature until a fluid temperature of 120° F. was reached. At this point, the heat and stirring was stopped and the sample was left to sit, undisturbed. After 30 minutes, 4,000 mL of the very hazy bottom aqueous phase was removed.

This 4,000 mL was processed through a KOCH XM-50 hollow fiber ultrafiltration membrane at 15 psig feed pressure and a feed flow rate of 3 gallons per minute. 3,000 mL of permeate from the ultrafilter was collected in a separate container for further analysis (Sample 2).

Analysis of Samples 1 and 2 were performed to determine if the addition of the B-230 insoluble hydraulic fluid product, and subsequent removal via 30 minutes of settling and ultrafilter processing had an effect on the product. Viscosity and cooling curve analysis were employed to determine if the quenching fluid is within its operating specifications. Results from these tests are below.

Kinematic viscosity comparison testing was performed with a Cannon-Fenske viscosity tube at 100° F. The viscosity of Sample 1 was 1.26 cSt and the viscosity of Sample 2 was 1.20 cSt. The difference between Sample 2 and Sample 1 was within the operating specifications for the Aqua Quench® 365 quenching fluid product.

IVF SmartQuench (Houghton plc, Manchester, England) comparison testing was then performed to determine the changes in the cooling characteristics of the Aqua Quench® 365 quenching fluid. The IVF SmartQuench compare report was generated by testing the samples at a medium temperature of 38° C., and an agitation rate (m/s) that was moderate (850 RPM). The table below indicates the characteristics of the quenching fluid before and after contamination with the hydraulic fluid and subsequent treatment for separation therefrom.

TABLE 4

| Property | Unit | Quenching Fluid after 1.ivf | Quenching Fluid after 2.ivf | Quenching Fluid before 1.ivf | Quenching Fluid before 2.ivf |
|---|---|---|---|---|---|
| Maximum cooling rate | ° F./sec | 374.65 | 375.84 | 372.91 | 365.17 |
| Temp at max cooling rate | ° F. | 1105.11 | 1095.71 | 1126.33 | 1090.42 |
| Temp at start of boiling | ° F. | 1510.12 | 1490.65 | 1517.5 | 1503.21 |
| Temp at start of convection | ° F. | 234.05 | 292.66 | 307.6 | 259.77 |
| Cooling Rate at 300° C. | ° F./sec | 172.22 | 163.06 | 163.39 | 151.9 |
| Time to 600° C. | sec | 3.45 | 3.68 | 2.89 | 3.29 |
| Time to 400° C. | sec | 4.54 | 4.78 | 4.02 | 4.45 |
| Time to 200° C. | sec | 6.94 | 7.35 | 6.67 | 7.24 |
| Theta 1[a] | ° F. | 1508.92 | 1489.73 | 1513.51 | 1499.86 |
| Theta 2[b] | ° F. | 417.69 | 428.99 | 452.05 | 457.9 |
| HP-IVF (Oils)[c] | | 2991.75 | 2842.08 | 2805.86 | 2846.79 |

[a]Theta 1 is the transition temperature from vapor phase to boiling phase.
[b]Theta 2 is the transition temperature from boiling phase to convection phase.
[c]HP-IVF(oils) is hardening power value.

Finally, FIG. 5 illustrates the cooling curves from these examples which essentially lay one on top of each other. These results indicate that the Aqua Quench® 365 (PAG) quenching product has the same cooling characteristics before contamination with the water insoluble hydraulic fluid and after contamination with, and following the process of recycling phase separation from and ultrafiltration from, the B-230 water insoluble hydraulic fluid product. Thus, after the separation process conditions, the aqueous quenching phase was sufficiently free of contamination that it could be removed and would be suitable for reintroduction into a quenching bath to meet quenching specifications.

In this case the ultrafiltration step produces a more clear recovered quenchant, which improves the quenched part quality from a visual standpoint. The ultrafiltration step removes the haziness of the recovered fluid, while not affecting the cooling curves. This prevents the haziness of the quenchant from adversely affecting the finish of the metal parts being cooled in the quenching fluid. Alternatively, depending upon the selected quenchants and hydraulic fluids, such an ultrafiltration step in the process or apparatus can improve the phase separation of the heating step.

Each and every patent, patent application, and publication, including publications listed below and/or cited throughout the disclosure, and U.S. provisional patent applications No. 61/866,198 filed Aug. 15, 2013 and No. 61/836,384 filed Jun. 18, 2013, is expressly incorporated herein by reference in its entirety. Embodiments and variations of this invention other than those specifically disclosed above may be devised by others skilled in the art without departing from the true spirit and scope of the invention. The appended claims include such embodiments and equivalent variations.

What is claimed is:

1. A process for recycling aqueous quenching fluids, said process comprising:
(a)(1) providing a metal quenching bath tank comprising a used metal aqueous quenching fluid containing contamination with a water insoluble, fire resistant hydraulic fluid, wherein the bath is no longer within its quenching specifications; or (a)(2) collecting, in a collection tank in association with a quench barrel or quench ring, used metal aqueous quenching fluid after the fluid has been sprayed onto heated metal, wherein the collected used fluid is contaminated with a water insoluble, fire resistant hydraulic fluid, and wherein the collected fluid is no longer within its quenching specifications;

(b) heating the bath tank (a)(1) or collection tank (a)(2) to a temperature of about 105 to 200° F. with agitation for less than 12 hours;

(c) recovering a resulting uncontaminated aqueous quenching phase from a lower portion of the bath tank (a)(1) or collection tank (a)(2); and (d) returning the recovered aqueous quenching phase to a functional quenching bath tank or functional quenching spray tank.

2. The process according to claim 1 comprising:

providing in a container a metal quenching bath comprising a used metal aqueous quenching fluid containing contamination with a water insoluble, fire resistant hydraulic fluid, wherein the bath is no longer within its quenching specifications;

heating the bath to a temperature of about 105 to 200° F. with agitation for less than 12 hours;

recovering the resulting uncontaminated aqueous quenching bath phase from the lower portion of the container; and returning the recovered aqueous quenching phase to a functional quenching bath.

3. The process according to claim 1 comprising:

collecting, in a first collection tank in association with a quench barrel or quench ring, used metal aqueous quenching fluid after the fluid has been sprayed onto heated metal, wherein the collected used fluid is contaminated with a water insoluble, fire resistant hydraulic fluid, and wherein the collected fluid is no longer within its quenching specifications;

heating the collected fluid to a temperature of about 105 to 200° F. with agitation for less than 12 hours;

recovering the resulting uncontaminated aqueous quenching phase from the lower portion of the first collection tank; and returning the recovered aqueous quenching phase to a functional quenching spray.

4. The process according to claim 1, further comprising one or more of:

cooling the recovered aqueous quenching phase before returning it into the functional quenching bath tank or functional quenching spray tank;

adjusting a concentration of the recovered aqueous quenching phase before returning it into the functional quenching bath tank or functional quenching spray tank;

having a heating temperature of about 150 to 180° F.;

skimming a hydraulic fluid phase from the top of the collection tank after heating into a second collection tank or decanting the hydraulic fluid phase from the collection tank into a second collection tank;

periodically flushing the collection tank to remove solid residue;

employing a heat pump to recycle heat from the heated bath tank or collection tank to provide energy for the performance of the quenching bath or quenching spray; and subjecting the recovered aqueous quenching phase from the lower portion of the container or tank to a filtration or ultrafiltration step prior to returning the aqueous phase to the functional quenching bath or spray.

5. The process according to claim 1, wherein the time period of heating is between about 15 minutes and 12 hours.

6. The process according to claim 1, further comprising recovering a hydraulic fluid phase from the bath tank (a)(1) or collection tank (a)(2).

7. The process according to claim 2, wherein heating occurs after the contaminated quenching bath fluid is transferred to a first collection tank.

8. The process according to claim 7, further comprising draining the aqueous quenching bath fluid from the bottom of the first collection tank after heating.

9. The process according to claim 1, wherein said hydraulic fluid and the aqueous quenching fluid are partially miscible; or wherein said hydraulic fluid is water insoluble and fire resistant; or wherein said hydraulic fluid comprises a vegetable oil.

10. The process according to claim 9, wherein said vegetable oil comprises canola oil or wherein the hydraulic fluid comprises trimethylolpropane (TMP) ester or polyol ester.

11. The process according to claim 1, wherein said aqueous quenching fluid comprises capped and non-capped polyalkylene glycols, polyvinylpyrrolidone (PVP), polyvinylpyrrolidone copolymers (VPC), polyethyloxazoline (PeOx), polyethyloxazoline copolymers, polyacrylate, polyacrylate copolymers, or mixtures thereof.

12. The process according to claim 1, wherein the quenching specifications for the functional quenching fluid comprise required viscosity, quenching speed, changes in cooling curves, and solids content.

13. The process according to claim 12, wherein the aqueous quenching bath outside of its quenching specification causes inefficient cooling, damage to a metal substrate, or increases in viscosity.

14. A quenching and recycling system for use in metal or metal alloy quenching, the system comprising:

a quenching tank for the immersion of a metal or metal alloy substrate, wherein the tank is designed to contain an aqueous quenching bath which meets required quenching specification;

hydraulic equipment associated with the tank, the hydraulic equipment using water-insoluble, fire-resistant hydraulic fluid;

wherein during use the quenching bath in the quenching tank becomes contaminated with the water-insoluble, fire resistant hydraulic fluid;

an agitation device for agitating the quenching tank;

a temperature controller system to cool the quenching bath in the quenching tank;

a first collection tank adjacent the quenching tank and connected to it via a first conduit to remove aqueous quenching bath fluid which does not meet its quenching specifications;

a heater capable of heating the first collection tank to a temperature of between about 105 and 200° F. for about 15 minutes to 12 hours;

an agitation device for agitating the first collection tank;

a second conduit exiting a lower portion of the first collection tank and connected to the quenching tank for return of an aqueous quenching bath phase; and a third conduit for removing hydraulic oil fluid to a second collection.

15. The system according to claim 14, further comprising one or a combination of:
- a cooling tank connected to the second conduit, wherein a recovered aqueous quenching bath phase is transported for cooling, and a fourth conduit exiting the cooling tank to transport the recovered cooled aqueous quenching bath phase to a functional quenching bath tank;
- a third collection tank connected to the second conduit, wherein the recovered aqueous quenching bath phase is transported for concentrating the recovered aqueous quenching bath phase, and a fifth conduit exiting the second collection tank to transport the recovered concentrated aqueous quenching bath phase to the functional quenching bath tank; and
- a heat pump positioned to recycle or transfer heat or energy from the first collection tank to the quenching tank.

16. The system according to claim 14, further comprising one or more of:
- a first pump to pump the contaminated quenching fluid and hydraulic oil into the first collection tank and a second pump to pump a recycled quenching bath phase from the first collection tank to the quenching tank; and
- a filtration or ultrafiltration membrane positioned in the first collection tank or interposed between the first collection tank and the second conduit.

17. A quenching and recycling system for use in metal or metal alloy quenching, the system comprising:
- a quench barrel or quench ring designed to apply an aqueous quenching spray onto a heated metal or metal alloy substrate, wherein the quenching spray meets required quenching specifications,
- hydraulic equipment associated with the quench barrel or quench ring, the equipment using water-insoluble, fire-resistant hydraulic fluid,
- wherein during use the quenching spray becomes contaminated with the water-insoluble, fire resistant hydraulic fluid;
- a first collection tank associated with the quench barrel or quench ring so as to collect used aqueous quenching spray following its application onto the metal substrate;
- a heater capable of heating the first collection tank to a temperature of between about 105 and 200° F. for about 15 minutes to 12 hours;
- an agitation device for agitating the first collection tank;
- a first conduit exiting a lower portion of the first collection tank and connected to a functional aqueous quenching spray tank for return of an aqueous quenching spray phase; and
- a second conduit for removing a hydraulic oil fluid phase to another collection tank for reuse as fuel or hydraulic oil.

18. The system according to claim 17, further comprising one or a combination of:
- a cooling tank connected to the first conduit, wherein recovered aqueous quenching spray phase is transported for cooling, and a third conduit exiting the cooling tank to transport the recovered cooled aqueous quenching spray phase to a functional quenching spray tank;
- a second collection tank connected to the first conduit, wherein the recovered aqueous quenching spray phase is transported for concentrating and a fourth conduit exiting the second collection tank to transport the recovered concentrated aqueous quenching spray phase to the functional quenching spray tank; and
- a heat pump positioned to recycle or transfer heat or energy from the heated first collection tank to the quench barrel or quench ring;
- a first pump to pump the contaminated quenching spray fluid and hydraulic oil into the first collection tank and a second pump to pump the recovered quenching spray phase from the first collection tank to the quench barrel or quench ring;
- a filtration or ultrafiltration membrane positioned in the first collection tank or interposed between the first collection tank and the first conduit; and
- a filtration or ultrafiltration membrane positioned in the second collection tank or interposed between the second cooling collection tank and the fourth conduit.

* * * * *